United States Patent
Kawakami et al.

(10) Patent No.: US 6,501,478 B1
(45) Date of Patent: Dec. 31, 2002

(54) IMAGE GENERATION DEVICE AND INFORMATION STORAGE MEDIUM

(75) Inventors: Masahide Kawakami, Kawasaki (JP); Takashi Satsukawa, Yokohama (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 09/207,639

(22) Filed: Dec. 9, 1998

(30) Foreign Application Priority Data

Dec. 12, 1997 (JP) .............................. 9-362736
Feb. 17, 1998 (JP) .......................... 10-051396

(51) Int. Cl.⁷ ............................................. G06F 17/00
(52) U.S. Cl. .......................................... 345/474; 463/2
(58) Field of Search ................................ 345/418, 473, 345/474, 958; 463/2

(56) References Cited

U.S. PATENT DOCUMENTS

| | | | | |
|---|---|---|---|---|
| 4,026,555 A | * | 5/1977 | Kirschner et al. | 273/85 R |
| 5,016,890 A | | 5/1991 | Sato et al. | |
| 5,190,286 A | | 3/1993 | Watanabe et al. | |
| 5,583,407 A | | 12/1996 | Yamaguchi | |
| 5,704,837 A | * | 1/1998 | Iwasaki et al. | 463/38 |
| 5,853,324 A | | 12/1998 | Kami et al. | |
| 5,986,675 A | * | 11/1999 | Anderson et al. | 345/473 |
| 6,126,547 A | * | 10/2000 | Ishimoto | 463/42 |

FOREIGN PATENT DOCUMENTS

| | | |
|---|---|---|
| JP | A-8-155142 | 6/1996 |
| JP | A-8-303997 | 11/1996 |
| JP | A-9-75552 | 3/1997 |
| JP | A-9-166417 | 6/1997 |
| JP | A-9-313737 | 12/1997 |
| JP | A-9-313738 | 12/1997 |
| WO | WO-88/04060 A2 * | 6/1988 ............. G01S/5/16 |
| WO | WO 88/04060 | 6/1998 |

* cited by examiner

*Primary Examiner*—Mark Zimmerman
*Assistant Examiner*—Lance W. Sealey
(74) *Attorney, Agent, or Firm*—Oliff & Berridge, PLC

(57) ABSTRACT

An image generation device and information storage medium that make it possible to increase the realism and degree of variety of the motion of a target object. When a shot has hit a target object within an object space, the motion of the target object varies with the direction of the trajectory of the shot that hit the target object. If a plurality of players are playing the game, the motion of the target object varies depending upon which player's shot has hit the target object. The system determines which of a plurality of angular ranges contains the angle between the direction of the shot trajectory and the direction in which the target object is facing, and plays motion data that has been set for the angular range that contains that angle. The orientation of the target object is corrected on the basis of this angle. Images as seen from first and second viewpoints are generated and output to first and second display screens. Trajectory directions are determined on the basis of the first and second viewpoints and landing positions on the first and second display screens.

10 Claims, 24 Drawing Sheets

FIG. 6A  FIRST DISPLAY SCREEN    SECOND DISPLAY SCREEN
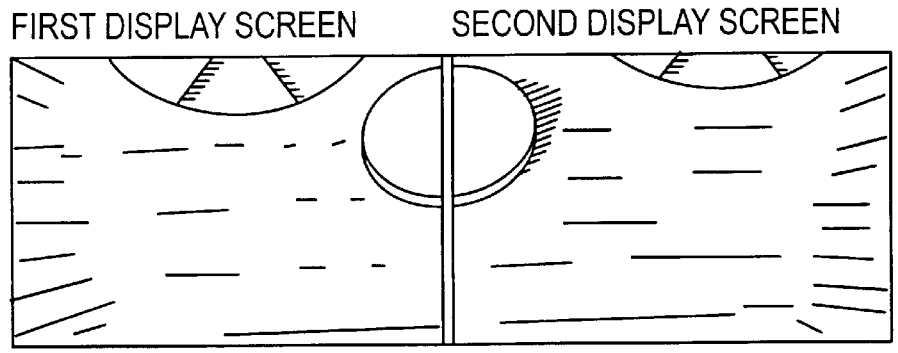
FIG. 6B
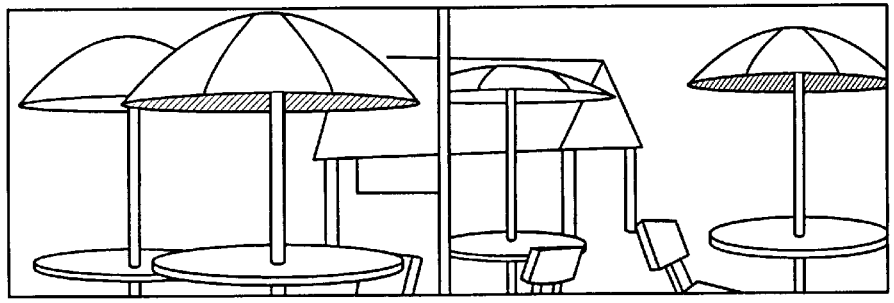
FIG. 6C
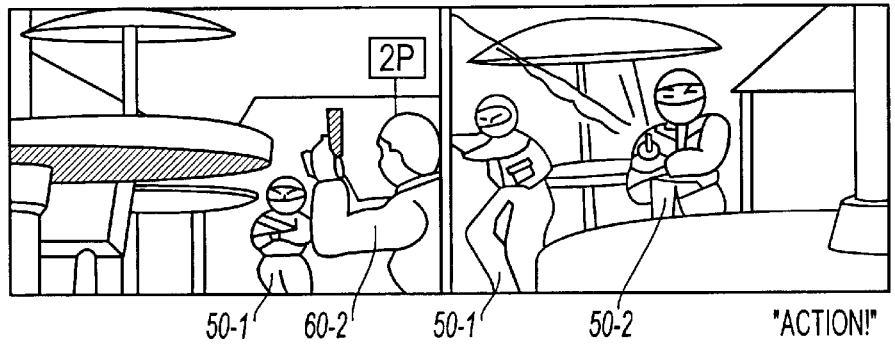
FIG. 6D
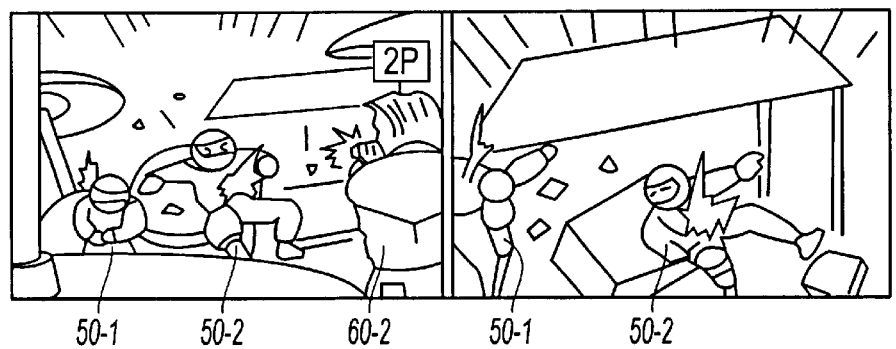

"ACTION!"

PLAY MOTION INDICATING A TARGET OBJECT BEING SHOT FROM IN FRONT
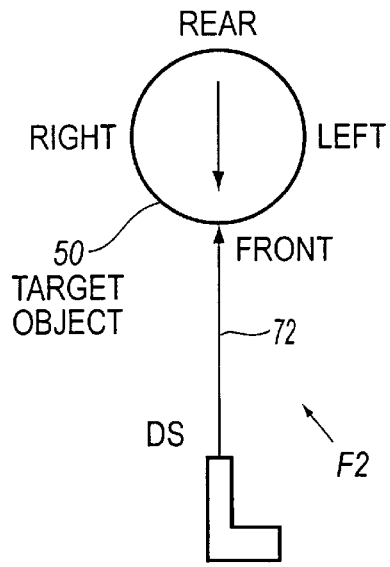
PLAY MOTION INDICATING A TARGET OBJECT BEING SHOT FROM THE LEFT
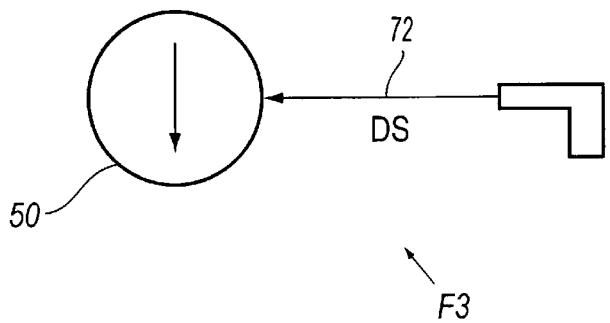
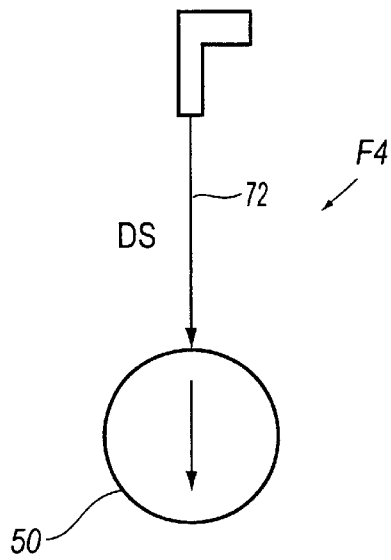
PLAY MOTION INDICATING A TARGET OBJECT BEING SHOT FROM THE REAR
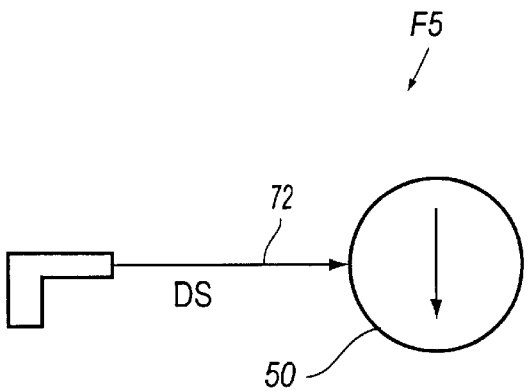
PLAY MOTION INDICATING A TARGET OBJECT BEING SHOT FROM THE RIGHT
FIG. 8

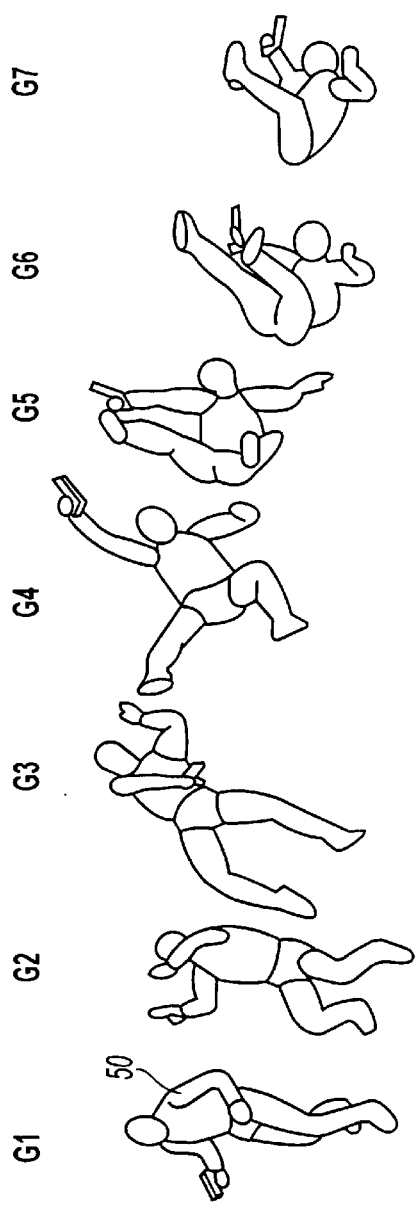
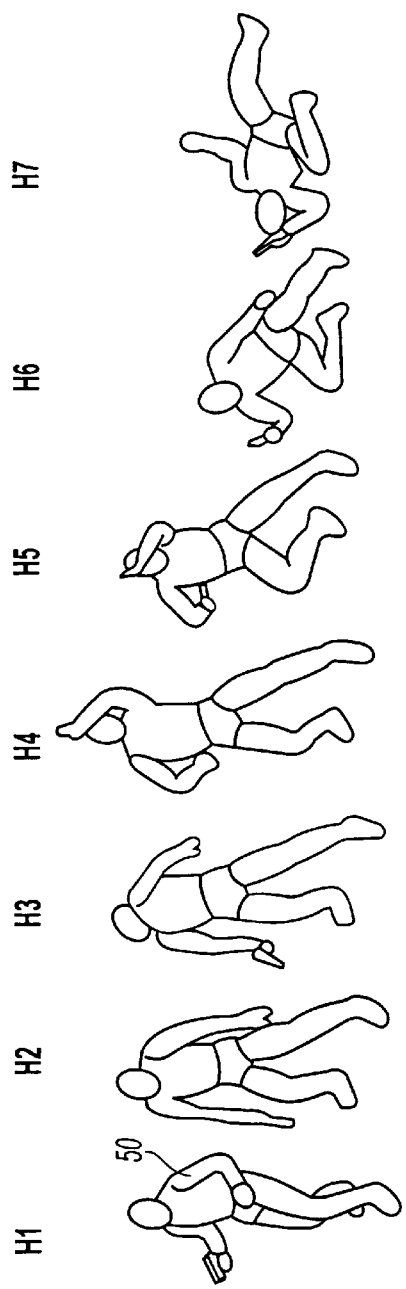
FIG. 9

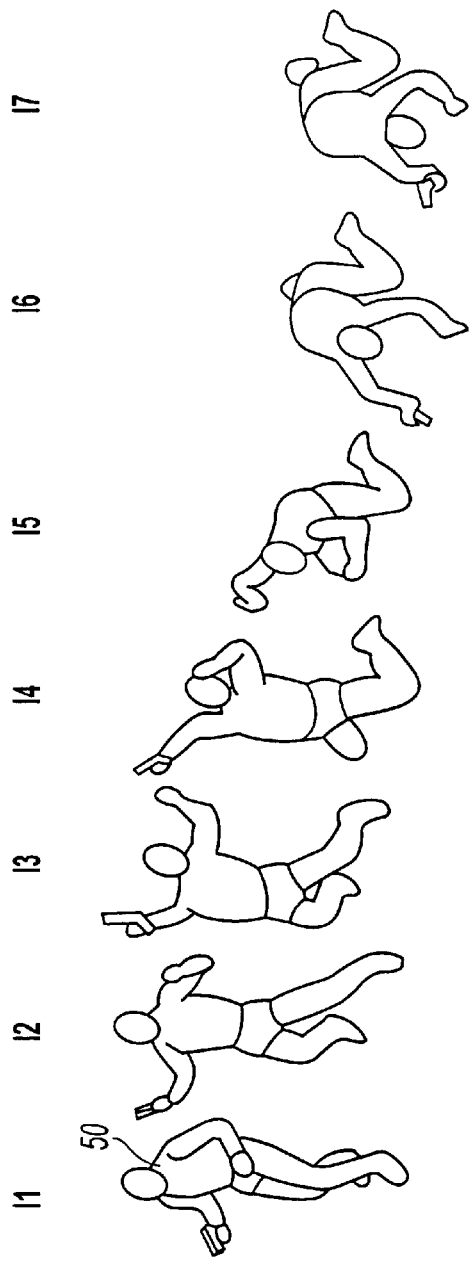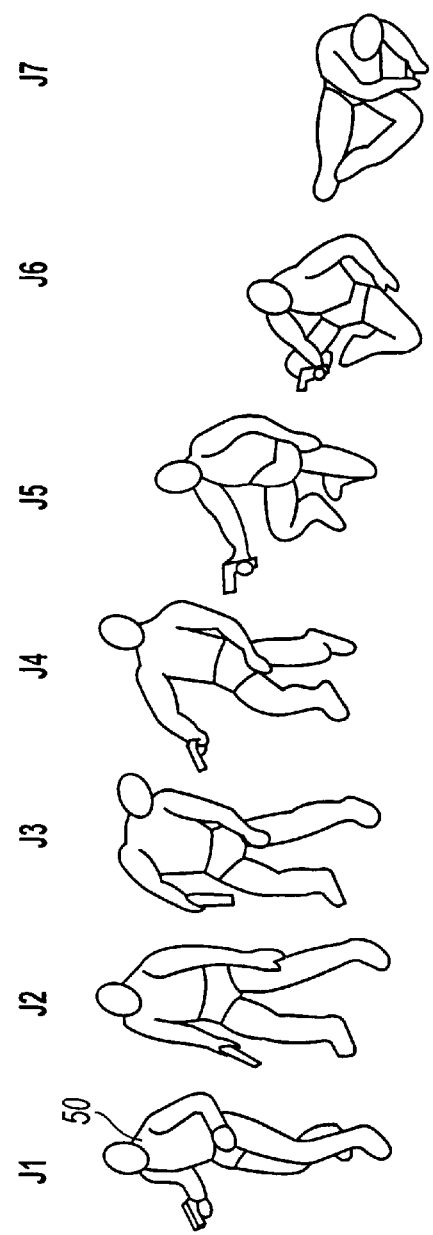
FIG. 10
MOTION INDICATING A TARGET OBJECT BEING SHOT FROM THE REAR
MOTION INDICATING A TARGET OBJECT BEING SHOT FROM THE RIGHT

PLAY MOTION INDICATING A TARGET OBJECT BEING SHOT FROM IN FRONT

PLAY MOTION INDICATING A TARGET OBJECT BEING SHOT FROM ABOVE

PLAY MOTION INDICATING A TARGET OBJECT BEING SHOT FROM IN FRONT

PLAY MOTION INDICATING A TARGET OBJECT BEING SHOT FROM THE REAR

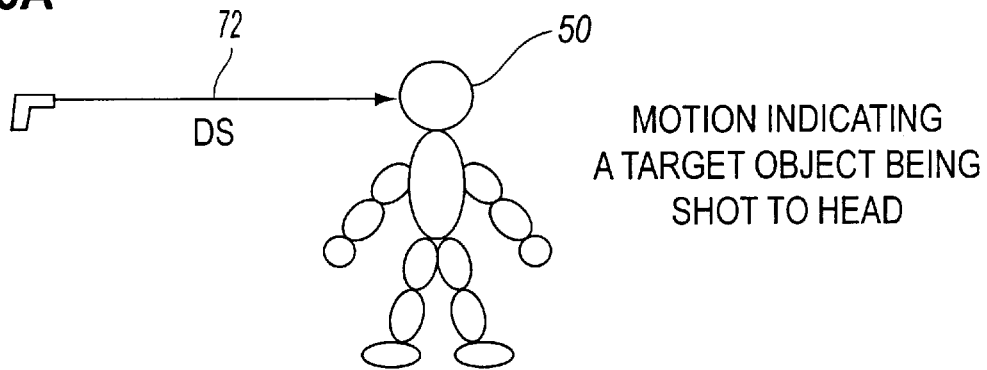
FIG. 13A — MOTION INDICATING A TARGET OBJECT BEING SHOT TO HEAD
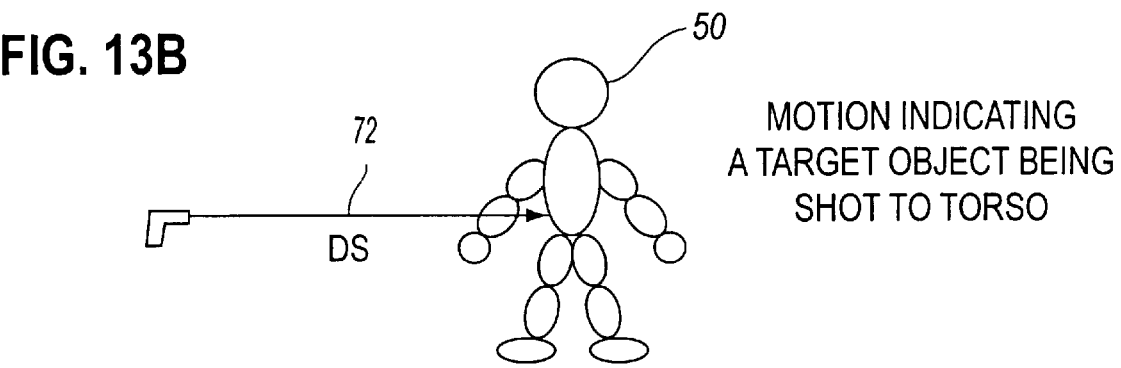
FIG. 13B — MOTION INDICATING A TARGET OBJECT BEING SHOT TO TORSO
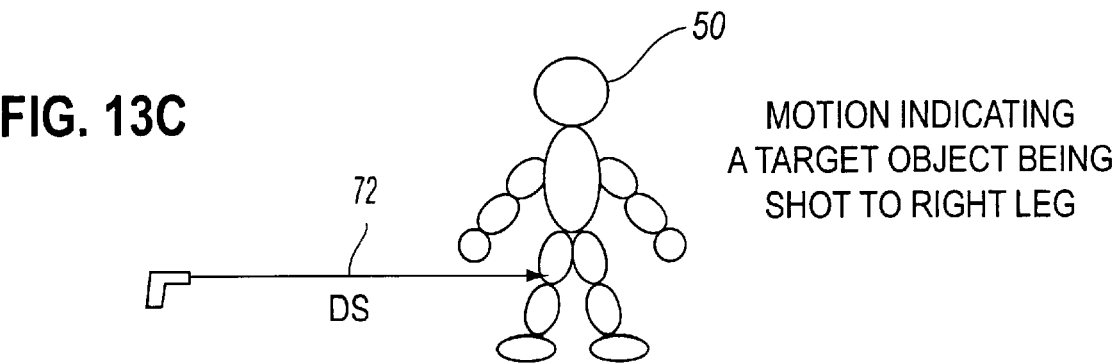
FIG. 13C — MOTION INDICATING A TARGET OBJECT BEING SHOT TO RIGHT LEG

PLAY MOTION INDICATING A TARGET OBJECT
BEING SHOT FROM THE RIGHT

ROTATION

THE TARGET OBJECT IS ROTATED THROUGH α=θ, THEN MOTION INDICATING THE TARGET OBJECT BEING SHOT FROM IN FRONT IS PLAYED

THE TARGET OBJECT IS
ROTATED THROUGH $\alpha=(\theta-90°)$,
THEN MOTION INDICATING
THE TARGET OBJECT BEING
SHOT FROM THE RIGHT IS PLAYED

IMAGE GENERATION DEVICE AND INFORMATION STORAGE MEDIUM

BACKGROUND OF THE INVENTION

1. Field of the Invention

This invention relates to an image generation device and an information storage medium for generating an image that enables a player to use a shooting device to shoot at a target object within an object space.

2. Description of Related Art

Image generation devices have been developed and implemented in the art, to enable a player to use a shooting device such as a handgun-shaped controller to shoot at a target object. When a player 520 pulls a trigger of a handgun-shaped controller 522 of such an image generation device, as shown in FIG. 1A, a two-dimensional position on a display screen 512 that is indicated by the handgun-shaped controller 522 is optically detected. If the thus-detected two-dimensional position matches the position of a two-dimensional target object that is displayed on the screen, this is determined to be a hit; if it does not match, this is determined to be a miss. This image generation device makes it possible for a player to enjoy the virtual experience of target-shooting or gun-fighting without using a real firearm, so it is highly popular as a game.

When a plurality of players play on an image generation device of this type (with a multi-player game), first and second players 520-1 and 520-2 both use the same display screen 512 in common, as shown in FIG. 1B. In other words, the viewpoints of the first and second players 520-1 and 520-2 within the object space are the same, and the first and second players 520-1 and 520-2 shoot by aiming at a target object seen from the same viewpoint.

A technical problem with this sort of image generation device is how to increase the sensation of virtual realism that is felt by the players. One method that could be considered for improving this virtual realism is to play (or replay, animate) the motion of a target object on the basis of previously prepared motion data when a shot fired by a player has hit the target object.

However, the motion of the target object that is played in this manner lacks realism and is monotonous, so that it is insufficient for solving the technical problem of improving the feeling of virtual reality.

SUMMARY OF THE INVENTION

This invention was devised in the light of the above described technical problems and has an objective thereof the provision of an image generation device and information storage medium that make it possible to increase the realism and variety of motions of target objects.

In order to address the above described technical problems, there is provided an image generation device for generating an image that enables at least one player to use a shooting device to shoot at at least one target object within an object space, according to a first aspect of the present invention. The image generation device comprises: means for processing for setting a plurality of objects, including a target object, within the object space; means for performing a hit check between a shot from the player and a target object; means for storing motion data for a target object; means for playing the motion of a target object on the basis of the motion data, when a shot has hit the target object, and also varying the motion of the target object in accordance with the direction of the trajectory of the shot that has hit the target object; and means for generating an image as seen from a given viewpoint within the object space.

According to a second aspect of the present invention, there is provided an information storage medium used in an image generation device for generating an image that enables at least one player to use a shooting device to shoot at at least one target object within an object space. The information storage medium comprises: information for processing for setting a plurality of object, including a target object, within the object space; information for performing a hit check between a shot from the player and a target object; information for storing motion data for a target object; information for playing the motion of a target object on the basis of the motion data when a shot has hit the target object, and also varying the motion of the target object in accordance with the direction of the trajectory of the shot that has hit the target object; and information for generating an image as seen from a given viewpoint within the object space.

With the image generation device and the information storage medium of this invention, the motion of the target object varies (or changes) in accordance with the direction of the trajectory of a shot from a player. When the target object is shot from in front, for example, a realistic motion is played to indicate that the target object has been shot from in front. Similarly, if the target object is shot from the left, from the rear, or from the right, a realistic motion is played (or replayed, animated) to indicate that the target object has been shot from the left, from the rear, or from the right, respectively. This makes it possible to greatly increase the realism and degree of variety of target object motions, improving the feeling of a virtual reality that the player experiences.

In the image generation device and the information storage medium of this invention, when a plurality of players are playing a game, the motion of a target object may be varied in accordance with which player's shot has hit the target object. Such a configuration makes it possible to further increase the degree of variety of motions of the target objects. It also means that there is no need to determine the direction of the shot trajectory directly, enabling motion play in accordance with the trajectory direction.

In the image generation device and the information storage medium of this invention, the motion of a target object may be varied in accordance with the hit portion of the target object that has been hit by a shot. This makes it possible to increase the degree of variety of motions, by playing motions that differ for different hit portions (or hit resions, hit locations), even when the direction of the shot trajectory is the same.

Note that in the image generation device and the information storage medium of this invention, the motion of a target object may be varied on the basis of an angle between the direction of the trajectory of a shot that has hit the target object and the direction in which the target object is facing.

In such a case, an angular range that contains the angle may be determined from a given plurality of angular ranges, and the motion of the target object may be played on the basis of motion data that has been set to the angular range that contains that angle. This makes it possible to reduce the storage capacity necessary for the motion data storage means, reducing the overall size of the hardware.

The orientation of a target object during motion play may be corrected on the basis of this angle. This makes it possible to play an accurate motion in a natural manner in accordance with this angle.

In the image generation device and the information storage medium of this invention, an image as seen from a first viewpoint in the object space may be generated and the thus generated image may be output to a first display screen for a first player; and an image as seen from a second viewpoint in the object space may be generated and the thus generated image may be output to a second display screen for a second player. With this configuration, a first player can enjoy shooting at target objects while viewing an image from a first viewpoint within the object space, and a second player can enjoy shooting at target objects while viewing an image from a second viewpoint within the object space. This makes it possible to greatly increase the feeling of a virtual reality and the dramatic effect of the game that the players experience, in comparison with the prior-art example in which the viewpoints of the first and second players are the same. It prevents uniformity of the displayed images and enables an increase in the degree of variety of the images. In addition, the virtual realities experienced by the first and second player can be made to differ.

In the image generation device and the information storage medium of this invention, the direction of the trajectory of a shot from the first player may be specified on the basis of the first viewpoint and a two-dimensional position on the first display screen indicated by a shooting device of the first player, and a hit check may be performed and the motion of the target object may be varied on the basis of the thus specified trajectory direction. The direction of the trajectory of a shot from the second player may also be specified on the basis of the second viewpoint and a two-dimensional position on the second display screen indicated by a shooting device of the second player, and a hit check may be performed and the motion of the target object may be varied on the basis of the thus specified trajectory direction. This makes it possible to perform a hit check from consideration of the trajectory direction, further increasing the realism of the game.

In the image generation device and the information storage medium of this invention, the motion of the target object may be varied in accordance with whether or not a given condition has been met since the target object was generated. This makes it possible to vary the motion of a target object in accordance with whether or not a given condition has been met, in addition to the direction of the shot trajectory. The degree of variety of target object motions can be increased thereby, and it is also possible to implement motion play that is not inconsistent.

Note that this condition could be any of various conditions, such as a condition relating to whether or not a given time has elapsed since the target object was generated, a condition relating to whether or not the motion play of a target object has been repeated a given number of times since the target object was generated, or a condition relating to whether or not an object relating to the motion play of a target object has disappeared since the target object was generated.

BRIEF DESCRIPTION OF THE DRAWINGS

FIGS. 6A, 6B, 6C, and 6D are schematic impressions of images generated by this embodiment;

FIG. 8 is illustrative of a method of varying the motion in accordance with trajectory direction;

FIG. 9 shows examples of motions when a target object is shot from in front or from the left;

FIG. 10 shows examples of motions when a target object is shot from the rear or from the right;

FIGS. 13A, 13B, and 13C are illustrative of a method of varying the motion in accordance with hit portion;

DESCRIPTION OF PREFERRED EMBODIMENTS

Preferred embodiment of this invention will now be described with reference to the accompanying drawings.

Note that, although the description below concerns a case in which there are two display screens, the present invention is not limited to that number of display screens and three or more display screens (three or more players) could equally well be provided. It is also possible to allocate a plurality of players to a single display screen. The description below also concerns an example in which this invention is applied to a gun-wielding game such that players use handgun-shaped controllers to enjoy a gun battle, but this invention can also be applied to other shooting games other than gun-wielding games. It can be applied to various other shooting games such as one in which controllers modeled in the shape of rifles are used instead of the handgun-shaped controllers, or in which shooting devices are fixed to a housing of a game machine.

Figure 2:
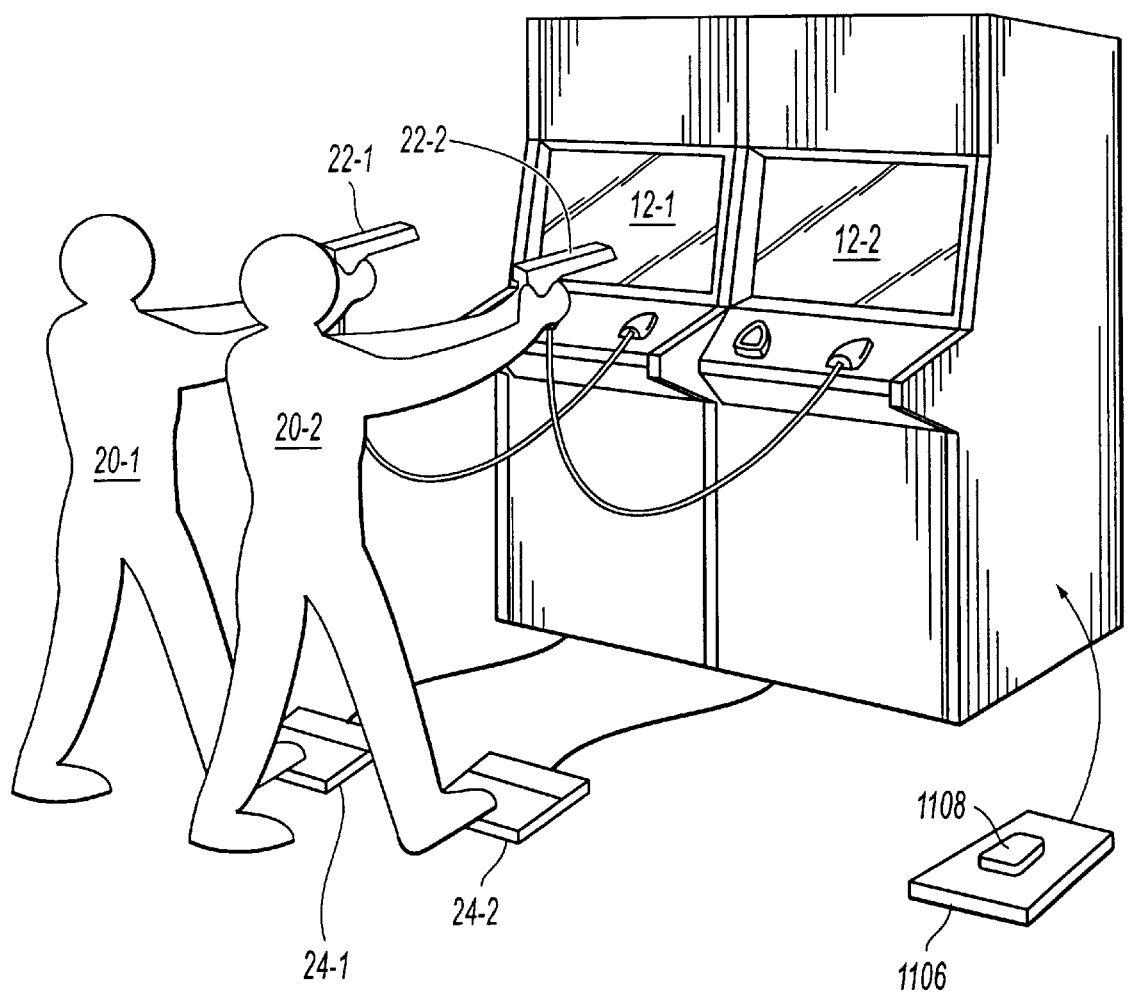
FIG. 2 shows an example of the external appearance of an image generation device of one embodiment of this invention.

An example of the external appearance of an arcade game machine when the image generation device of this embodiment is applied thereto is shown in FIG. 2.

This embodiment is provided with a first display screen 12-1 for a first player (hereinafter called the "1P player") 20-1 and a second display screen 12-2 for a second player (hereinafter called the "2P player") 20-2, as shown in FIG. 2. Images as seen from a first viewpoint in an object space are displayed on the first display screen 12-1 and images as seen from a second viewpoint in the object space are displayed on the second display screen 12-2. The 1P player 20-1 enjoys a gun-wielding game by using a handgun-shaped controller (shooting device) 22-1 to shoot at a target object that appears on the first display screen 12-1. Similarly, the 2P player 20-2 enjoys the gun-wielding game by using a handgun-shaped controller 22-2 to shoot at a target object that appears on the second display screen 12-2.

Note that, in this embodiment, character objects (virtual players) corresponding to the players on the display screens 12-1 and 12-2 can be made to duck down and stand up (lower and raise the viewpoints thereof), by stepping on pedals 24-1 and 24-2. This makes it possible to perform actions such as using an obstacle to avoid an attack from a target (enemy) object.

In this embodiment, the 1P player 20-1 and the 2P player 20-2 can enjoy the gun-wielding game while viewing images from mutually different viewpoints. This enables a great improvement in the degree of virtual realism and the dramatic effect of the game over the prior-art machine shown in FIG. 1B.

Figure 1A:
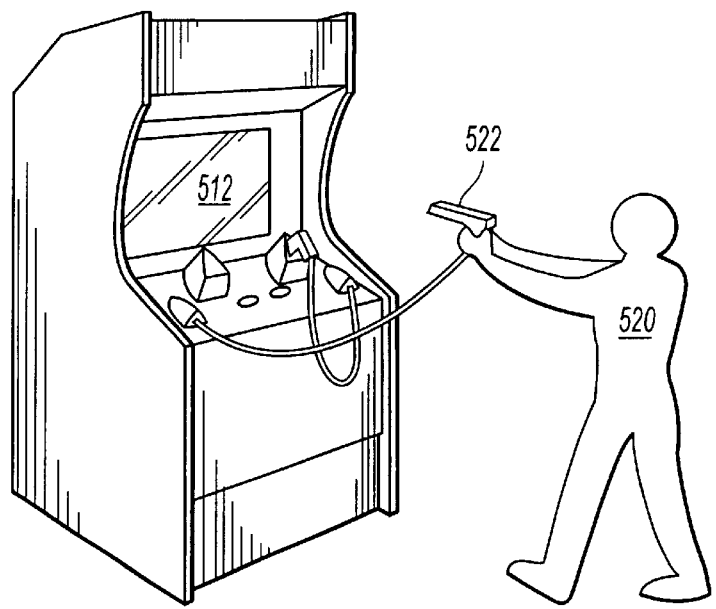
FIGS. 1A and 1B are views illustrating problems with a prior-art gun-wielding game.
Figure 1B:
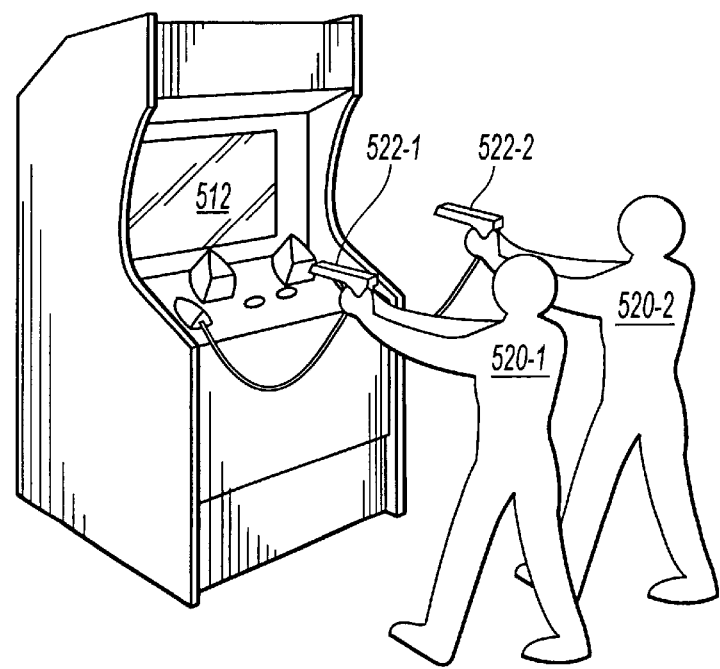

In other words, the first and second players 520-1 and 520-2 see images from the same viewpoint with the game machine of FIG. 1B, and it is impossible to increase the virtual reality experience even further. In contrast thereto, this embodiment shown in FIG. 2 enables the 1P and 2P players 20-1 and 20-2 to see images from different viewpoints, in a similar manner to the real world. As a result, it is possible to obtain a realistic feeling of experiencing a gun battle in the real world, which greatly improves the degree of virtual realism.

In addition, the first and second players 520-1 and 520-2 in FIG. 1B always see the same images, so that the game dramatization ends up as being uniformly monotonous. With this embodiment of the invention, in contrast, the first viewpoint created for the first display screen 12-1 and the second viewpoint created for the second display screen 12-2 can be controlled independently. Thus the images displayed on the first display screen 12-1 and the images displayed on the second display screen 12-2 can be made mutually different. In other words, it is possible to achieve a game dramatization such that an image as seen from the front of a target object is displayed on the first display screen 12-1, for example, and an image as seen from the rear of the target object is displayed on the second display screen 12-2. It is also possible to achieve a game dramatization such that a target object appears from the left side of the first display screen 12-1 and a target object appears from the right side of the second display screen 12-2. This means that the variety of images presented to the players can be increased, and thus the dramatic effect of the game can be greatly heightened.

Furthermore, this embodiment makes it possible to experience different virtual realities when playing the game while viewing the first display screen 12-1 and when playing the game while viewing the second display screen 12-2. This means that a player who has played the game once from the first display screen 12-1 side can look forward to playing the game again from the second display screen 12-2 side. As a result, the efficiency of the image generation device in the game equipment can be increased.

Figure 3:
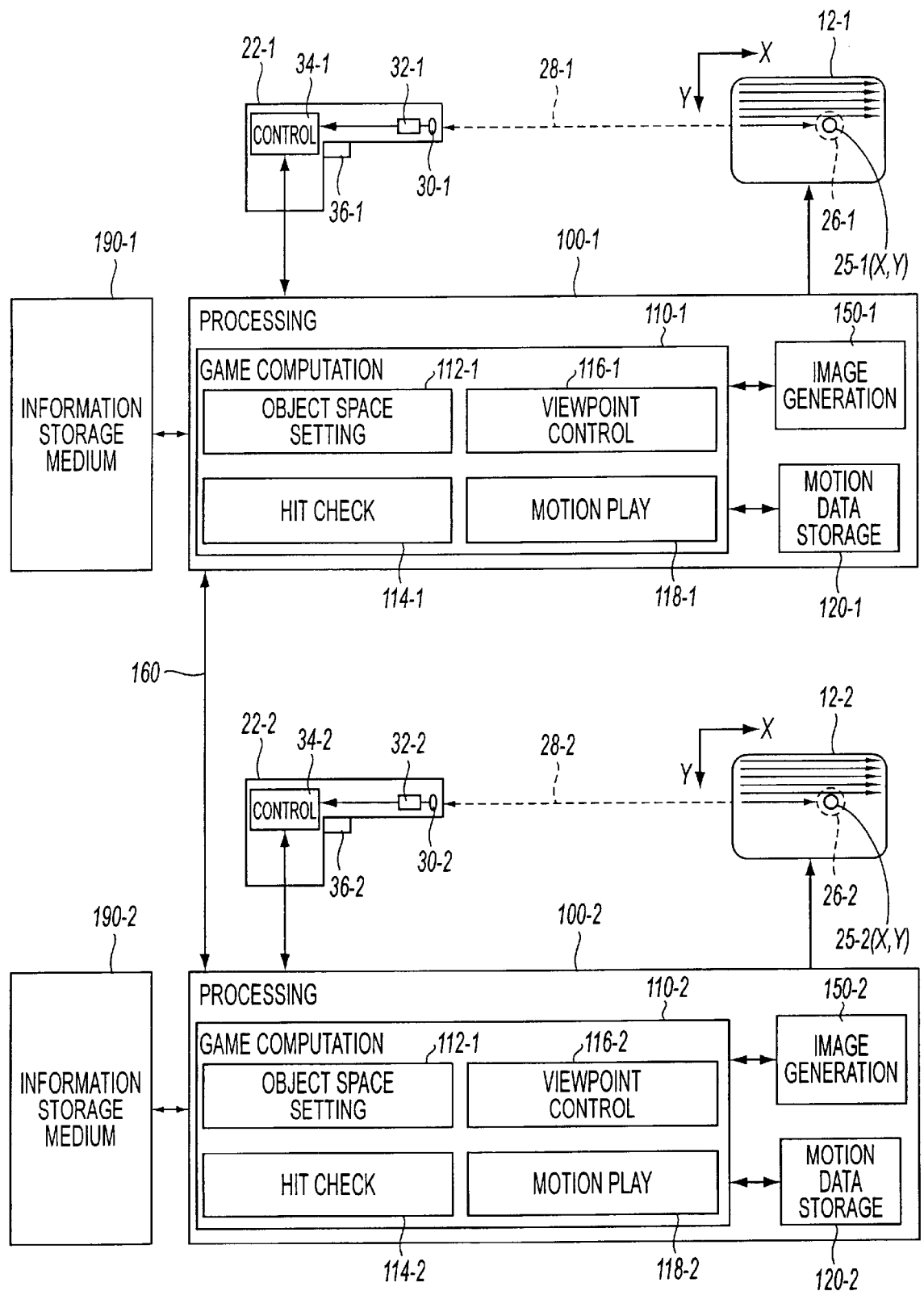
FIG. 3 shows an example of the functional block diagram of the image generation device of this embodiment.

An example of a functional block diagram of the image generation device of this embodiment is shown in FIG. 3.

In this case, the handgun-shaped controllers 22-1 and 22-2 are each formed to have a hollow shape, lenses 30-1 and 30-2 are provided in the respective tips thereof, and photosensors 32-1 and 32-2 are provided in the respective interiors thereof. This configuration ensures that light beams 28-1 and 28-2 from the directions in which the respective handgun-shaped controllers 22-1 and 22-2 are pointing can be detected by the photosensors 32-1 and 32-2. When the 1P and 2P players 20-1 and 20-2 (see FIG. 2) point the respective handgun-shaped controllers 22-1 and 22-2 towards the first and second display screens 12-1 and 12-2 and pull triggers 36-1 and 36-2, the corresponding first and second display screens 12-1 and 12-2 are made to flash. This flashing of the display screens makes it possible to ensure that light has been detected by the handgun-shaped controllers 22-1 and 22-2. When the raster scan of each of the first and second display screens 12-1 and 12-2 passes through detection areas 26-1 and 26-2 of a given size around each of indicated positions 25-1 and 25-2 of the handgun-shaped controllers 22-1 and 22-2 (the positions at which the handgun-shaped controllers 22-1 and 22-2 are pointing), this scan beam is detected by the corresponding photosensors 32-1 and 32-2. The photosensors 32-1 and 32-2 then output detection pulses.

The handgun-shaped controllers 22-1 and 22-2 comprise control sections 34-1 and 34-2, respectively. Each of these control sections 34-1 and 34-2 comprises components such as an X counter and a Y counter (not show in the figure). The detection pulses from the photosensors 32-1 and 32-2 are input to the corresponding control sections 34-1 and 34-2. The control sections 34-1 and 34-2 detect the X and Y coordinates of indicated (landing) positions 25-1 and 25-2 of the respective handgun-shaped controllers 22-1 and 22-2, based on data such as these detection pulses, a clock signal, a horizontal synchronization signal, and a vertical synchronization signal.

Note that the function of detecting the X and Y coordinates of each of the indicated positions 25-1 and 25-2 could be possessed by the handgun-shaped controllers 22-1 and 22-2 as described above, or it could be possessed by processing sections 100-1 and 100-2.

Each of the processing sections 100-1 and 100-2 performs processing such as that for disposing objects within the object space, performing a hit check, and generating an image as seen from a given viewpoint of the object space, based on the input data from the handgun-shaped controllers 22-1 and 22-2 and a given program. The functions of these processing sections 100-1 and 100-2 could be implemented by hardware such as a CPU (either CISC or RISC), a DSP, a custom IC (such as a gate array), or memory.

Information storage media 190-1 and 190-2 are used for storing programs and data. The functions of these information storage media 190-1 and 190-2 could be implemented by hardware such as a CD-ROM, game cassette, IC card, magneto-optical disk, floppy disk, digital video disk, hard disk, or memory. The processing sections 100-1 and 100-2 perform the various kinds of processing thereof based on programs and data from these information storage media 190-1 and 190-2.

The processing sections 100-1 and 100-2 comprise corresponding game computation sections 110-1 and 110-2, image generation sections 150-1 and 150-2, and motion data storage sections 120-1 and 120-2.

In this case, the game computation sections 110-1 and 110-2 perform the various processing required during the game, such as setting the game mode, moving the game forward, disposing the objects within the object space, performing a hit check, and determining the viewpoint position and line-of-sight direction.

The image generation sections 150-1 and 150-2 each generates and outputs an image as seen from a given viewpoint within the object space as set by the corresponding game computation sections 110-1 and 110-2. The images generated by the image generation sections 150-1 and 150-2 are displayed on the corresponding first and second display screens 12-1 and 12-2.

The motion data storage sections 120-1 and 120-2 are used for storing data on various motions. This motion data is contained in the information storage media 190-1 and 190-2 at initialization and it is transferred from the information storage media 190-1 and 190-2 to the motion data storage sections 120-1 and 120-2 at a suitable time such as power-on.

The game computation sections 110-1 and 110-2 comprise corresponding object space setting sections 112-1 and 112-2, hit check sections 114-1 and 114-2, viewpoint control sections 116-1 and 116-2, and motion play (or motion replay, motion animation) sections 118-1 and 118-2.

In this case, each of the object space setting sections 112-1 and 112-2 performs processing for setting objects such as target objects, character objects (virtual players), background objects, and map objects within the object space. More specifically, each determines the disposition of background objects and map objects with respect to the game stage, causes target objects to appear in the corresponding player's field of view as the game progresses, and moves the character objects around.

Each of the hit check sections 114-1 and 114-2 checks whether a shot from the corresponding 1P or 2P player has hit a target object. More specifically, first and second trajectories of shots are obtained from indicated positions 25-1 and 25-2 of the handgun-shaped controllers 22-1 and 22-2 (see FIG. 3) and the first and second viewpoints of the 1P and 2P players, for example. A check on whether each shot has hit a target object is based on whether or not the corresponding first or second trajectory intersects the target object.

The viewpoint control sections 116-1 and 116-2 control the corresponding first and second viewpoints of the 1P and 2P players. More specifically, the positions of the first and second viewpoints and the line-of-sight direction and field of view as seen from each of the first and second viewpoints are controlled on the basis of a given viewpoint control program and viewpoint control data. In this embodiment of the invention, this control over the first and second viewpoints by the corresponding viewpoint control sections 116-1 and 116-2 is successful in supplying a wide variety of different images to each of the 1P and 2P players.

The motion play sections 118-1 and 118-2 play (or replay, animate) the motion data that is stored in the motion data storage sections 120-1 and 120-2. The motion play sections 118-1 and 118-2 also correct the orientation of the target object based on an incoming-shot angle (or an incident angle).

Note that the processing sections 100-1 and 100-2 of this embodiment communicate necessary data through a communications line 160. The communicated data includes data concerning the results of hit checks, by way of example. If the setup is such that only one of these processing sections controls a target object, that processing section sends details about the target object, such as its position, direction, and type, to the other processing section over this communications line 160.

Figure 4:
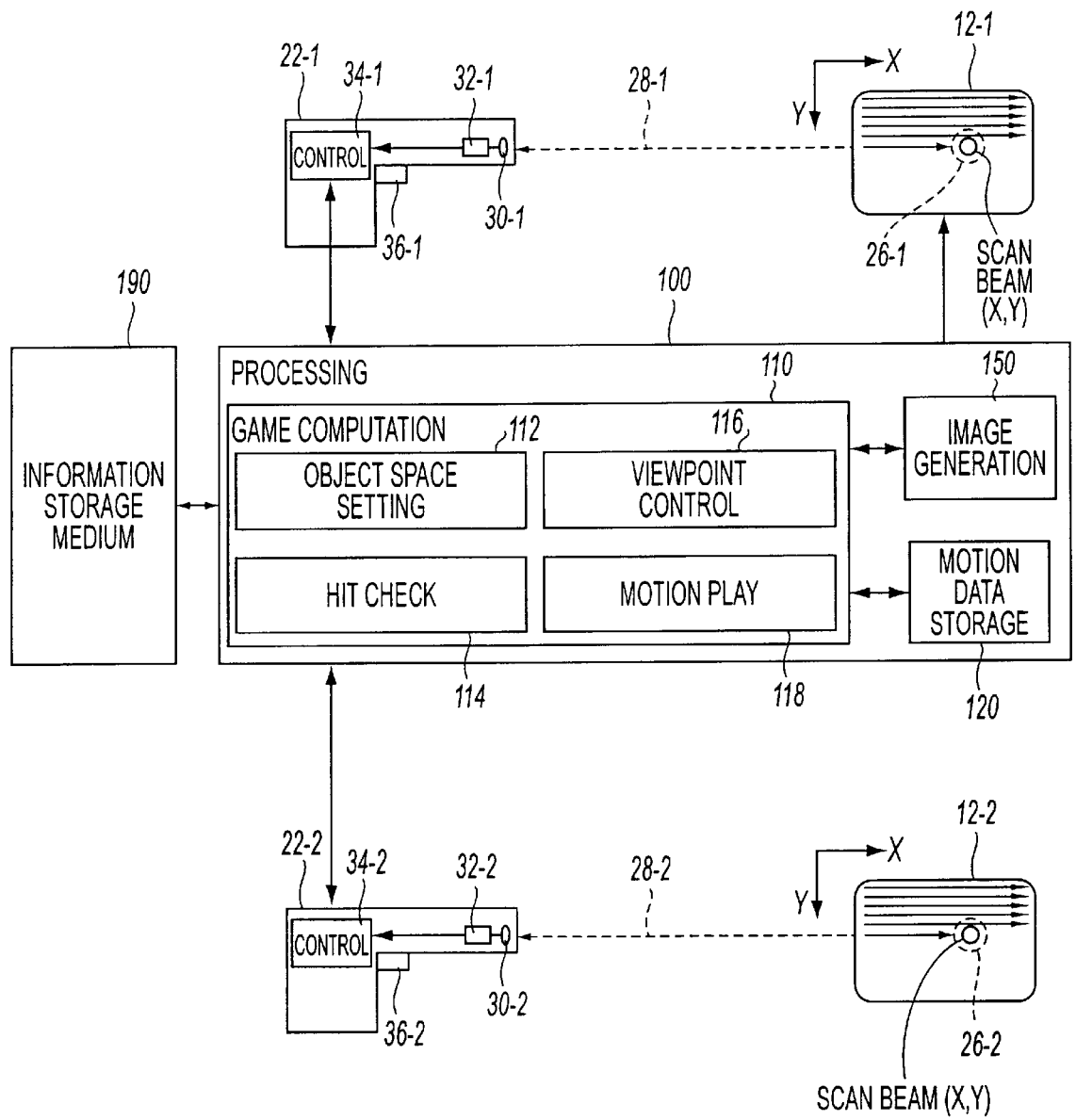
FIG. 4 shows another example of the functional block diagram of the image generation device.

It should be noted that the configuration of the image generation device of this invention is not limited to that shown in FIG. 3, and thus it can be implemented in other ways, such as that shown in FIG. 4, by way of example. In this figure, the functions of the processing sections 100-1 and 100-2 and the information storage media 190-1 and 190-2 are fulfilled by a processing section 100 and an information storage medium 190. A hit check section 114 performs both a hit check between a target object and a shot from the 1P player and a hit check between a target object and a shot from the 2P player, for example. Similarly, a viewpoint control section 116 controls both the first viewpoint of the 1P player and the second viewpoint of the 2P player. An image generation section 150 generates both images to be output to the first display screen 12-1 and images to be output to the second display screen 12-2.

The description now turns to a gun-wielding game that is implemented by this embodiment of the invention.

Figure 5:
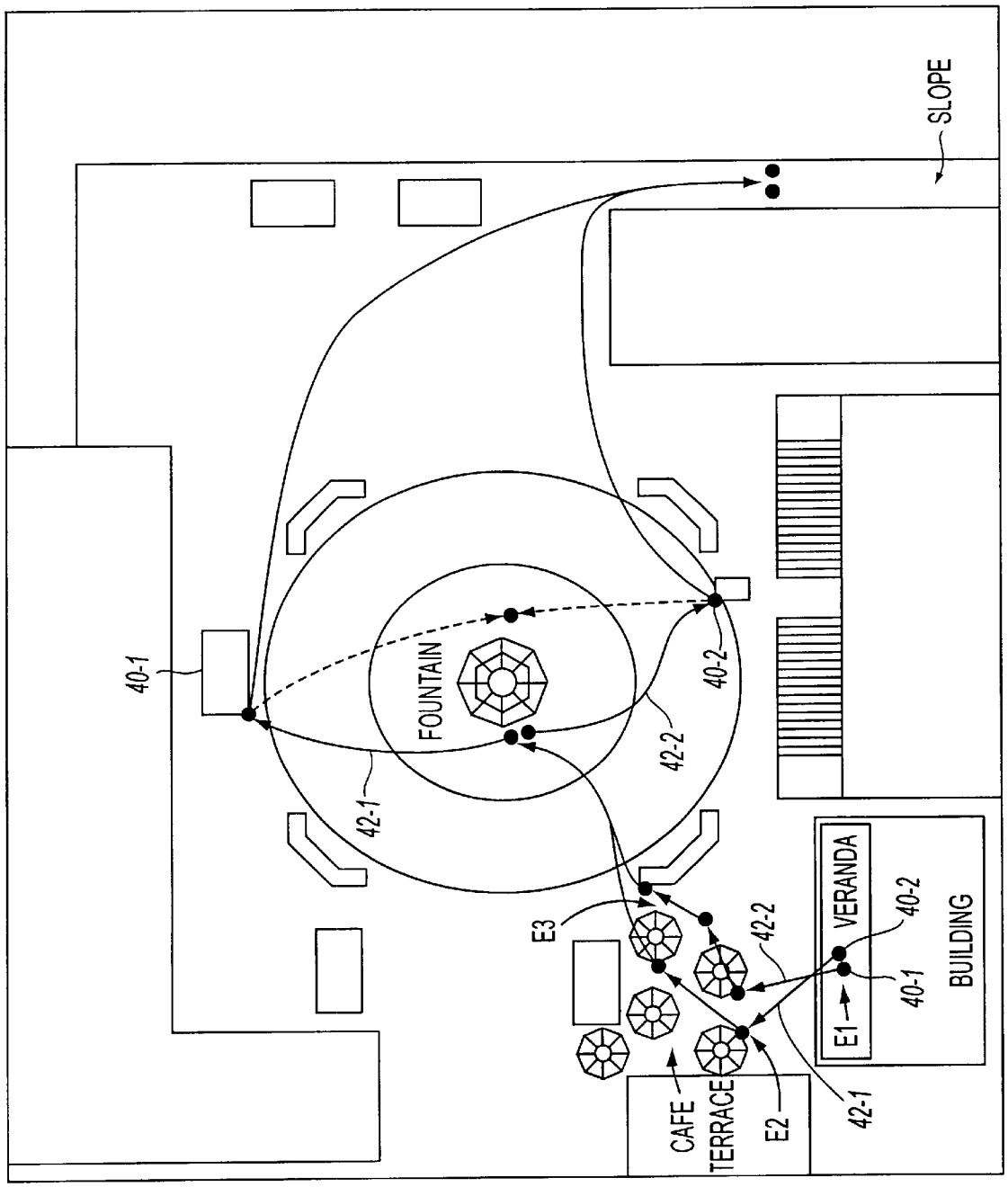
FIG. 5 shows an example of a game stage for a gun-wielding game that is implemented by this embodiment.

A typical map of the game stage of this gun-wielding game is shown in FIG. 5. As shown in this figure, first and second viewpoints 40-1 and 40-2 (character objects) of the 1P and 2P players move along given movement paths 42-1 and 42-2, respectively. Control over the movements of the first and second viewpoints 40-1 and 40-2 in this case is based on a given viewpoint control program and viewpoint control data. The line-of-sight direction and field of view as seen from each of the first and second viewpoints 40-1 and 40-2 are also controlled. This ensures that modified images can be supplied to each player.

Examples of images that are generated by this embodiment and displayed on the first and second display screens 12-1 and 12-2 are shown schematically in FIG. 6A to FIG. 7C.

FIGS. 6A and 6B show examples of the images seen when the first and second viewpoints 40-1 and 40-2 are positioned at E1 and E2, respectively, of FIG. 5. The character objects of the 1P and 2P players, who are chasing an enemy boss, jump down from the veranda of a building and move onto a café terrace. Note that the fields of view of the 1P and 2P players do not overlap in the first and second display screens shown in FIGS. 6A and 6B, but these fields of view could overlap if required.

When a combat point on the café terrace is reached, target (enemy) objects 50-1 and 50-2 appear, as shown in FIG. 6C. At that point, a game sound "Action!" is heard and a gun battle starts. The 1P and 2P players 20-1 and 20-2 aim and shoot at the target objects 50-1 and 50-2 with the respective handgun-shaped controllers 22-1 and 22-2, as shown in FIG. 2. The players can make the corresponding character objects rise by stepping on the pedals 24-1 and 24-2. On the other hand, they can make the corresponding character objects duck down and hide behind an obstacle by removing their feet from the pedals 24-1 and 24-2. If a shot hits one of the target objects 50-1 and 50-2, an action occurs to indicate that the target object has been hit, as shown in FIG. 6D.

Figure 7A:
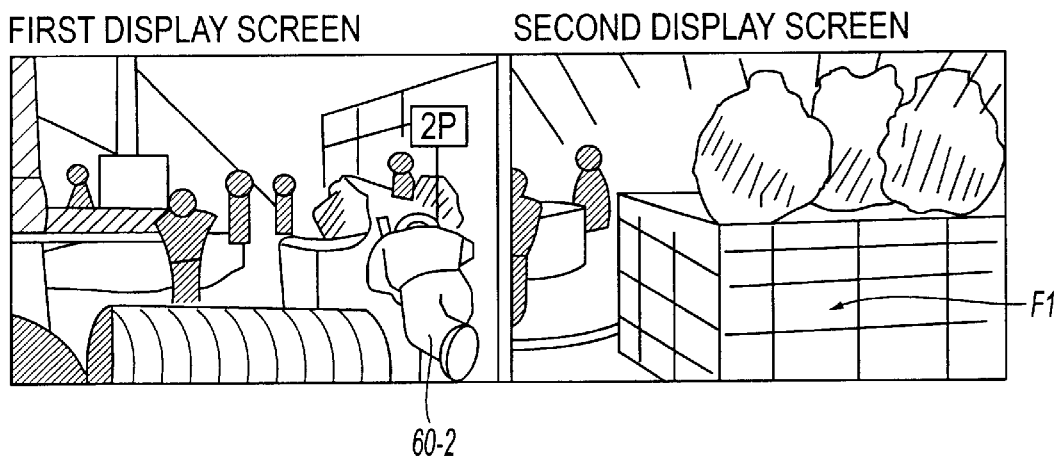
FIGS. 7A, 7B, and 7C are schematic impressions of more images generated by this embodiment.
Figure 7B:
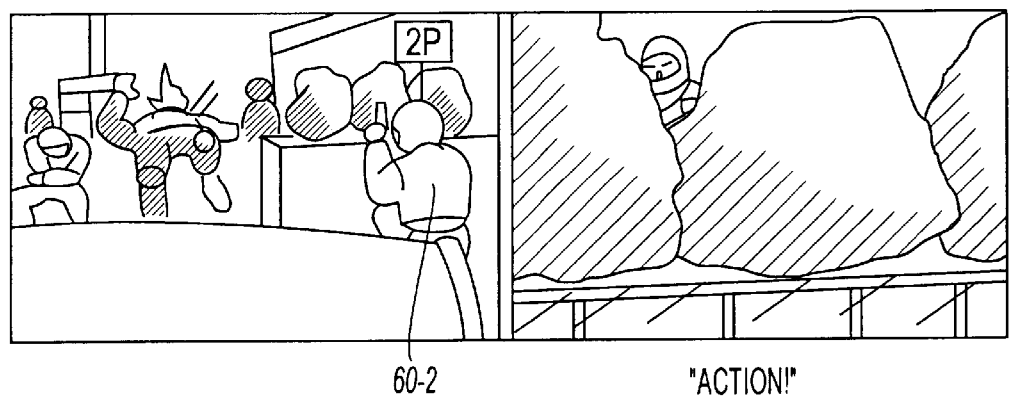
Figure 7C:
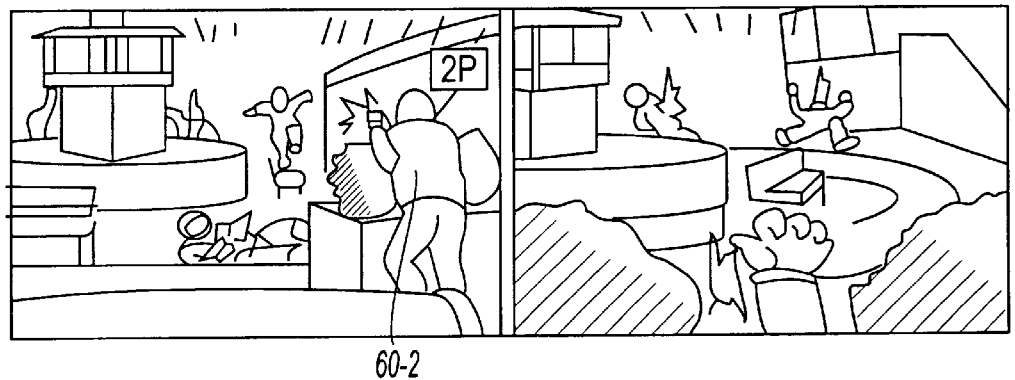

The combat point then moves from the position indicated by E2 in FIG. 5 to the position indicated by E3. At this point, the 2P character object 60-2 (the second viewpoint 40-2) moves first, then waits at the position indicated by F1, as shown in FIG. 7A. Subsequently, the game sound "Action!" is heard and another gun battle starts, as shown in FIG. 7B. If a shot hits a target object, as shown in FIG. 7c, an action is performed to indicate that the target object has been hit.

A first characteristic of this embodiment is that the motion of the target object is varied (or changed, modified) in accordance with the direction of the trajectory of the shot that has hit the target object.

More specifically, if the direction DS of a trajectory (or path) 72 of a shot that hits a target object 50 is the direction as indicated by F2 in FIG. 8, a motion indicating a target object being shot from in front (a motion that is used when the target object is shot from in front) is played as the motion of the target object 50. In other words, a motion such as that shown in G1 to G7 of FIG. 9 is played, by way of example.

If the direction DS of the trajectory 72 is the direction as indicated by F3 in FIG. 8, a motion indicating a target object being shot from the left is played, as shown by way of example in H1 to H7 of FIG. 9. If the direction DS of the trajectory 72 is the direction as indicated by F4, a motion indicating a target object being shot from the rear is played, as shown by way of example in I1 to I7 of FIG. 10. If the direction DS of the trajectory 72 is the direction as indicated by F5, a motion indicating a target object being shot from the right is played, as shown by way of example in J1 to J7 of FIG. 10.

Note that this motion play (or motion replay, motion animation) is handled by the motion play sections 118-1 and 118-2 of FIG. 3. Data such as that for the motions shown by G1 to G7 and H1 to H7 of FIG. 9 and I1 to I7 and J1 to J7 of FIG. 10 (position and direction data for each part object of the target object, for each frame) is stored in the motion data storage sections 120-1 and 120-2.

With this embodiment of the invention, the realism and degree of variety of the motions of a target object after it has been hit by a shot can be greatly increased by varying the motion with the trajectory direction DS in this manner.

For example, consider the case in which the 1P character object (first viewpoint) corresponding to the 1P player and the 2P character object (second viewpoint) corresponding to the 2P player are positioned at different locations within the object space, such as in the previously described FIGS. 6B and 6C. In this case, this embodiment of the invention handles the direction of trajectory of a shot from the 1P player differently from the direction of trajectory of a shot from the 2P player, to reflect this difference in positions. With this embodiment, the motion played when a target object is hit varies in accordance with this difference in trajectory direction, as shown in FIG. 8. This makes it possible to ensure that the motions of target objects 50-1 and 50-2 played when shots from the 1P player has hit them are different from the motions played when shots from the 2P player has hit them. As a result, the degree of variety and the realism of the game images can be increased, thus greatly improving the feeling of a virtual reality that the players experience. In addition, differences in the played motion of the target object can give the players a feeling that the 1P character object and the 2P character object are positioned at different locations.

In addition, if the 1P player sees the target objects 50-1 and 50-2 perform a motion of falling towards the left, as shown in FIG. 6D, the 1P player can perceive that they were not hit by the player's own shots, but by shots fired by the 2P player. If the 1P player sees the target objects 50-1 and 50-2 perform a motion of falling backwards, on the other hand, the 1P player can perceive that they were hit by his own shots, not by shots from the 2P player. In other words, each player can perceive whether a shot that has hit a target object is the result of the player's own shooting or the result obtained by the partner with which the player is playing cooperatively.

A second characteristic of this embodiment is that, when a plurality of players are playing this game, the motion of a target object when hit is varied in accordance with which of the players has shot the target object.

Figure 11A:
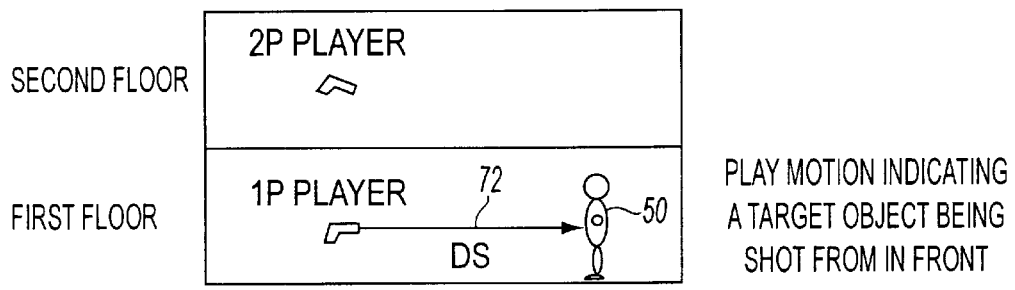
FIGS. 11A, 11B, 11C, and 11D are illustrative of a method of identifying a player and varying the motion accordingly.
Figure 11B:
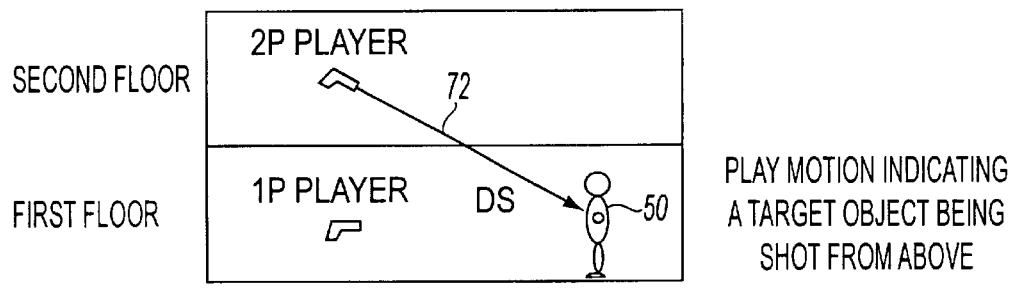
Figure 12:
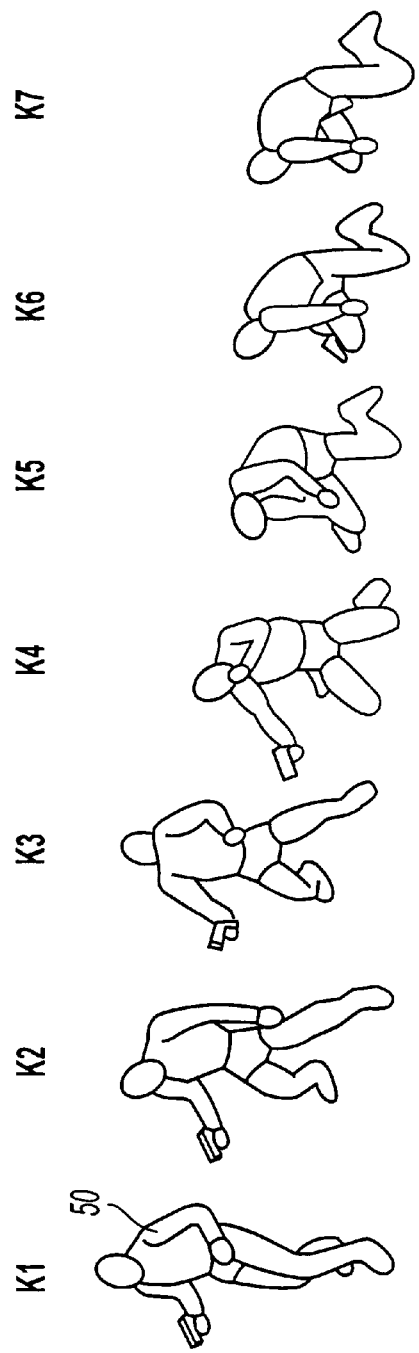
FIG. 12 shows an example of a motion used when a target object is shot from above.

Consider a case in which the 1P character object corresponding to the 1P player is positioned on the first floor at the same level as the target object 50 and the 2P character object corresponding to the 2P player is positioned on the second floor, as shown in FIGS. 11A and 11B by way of example. In this case, if a shot from the 1P player on the first floor hits the target object 50 as shown in FIG. 11A, the played motion is one that is used when the target object is shot from in front, as shown by G1 to G7 of FIG. 9. If a shot from the 2P player on the second floor hits the target object 50 as shown in FIG. 11B, on the other hand, the played motion is one that is used when the target object is shot from above, as shown by K1 to K7 of FIG. 12.

Figure 11C:
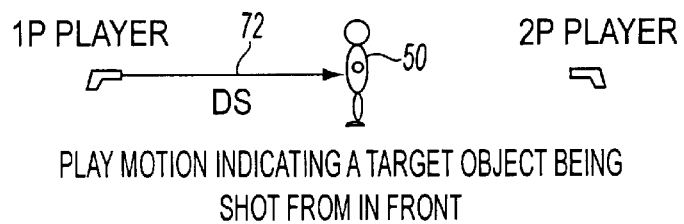
Figure 11D:
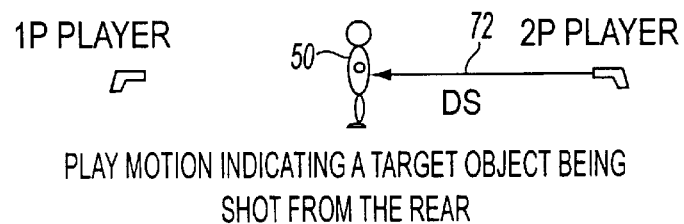

Consider another case, for example, in which the 1P character object is positioned in front of the target object 50 and the 2P character object is positioned behind the target object 50, as shown in FIGS. 11C and 11D. In that case, if a shot from the 1P player hit the target object 50 as shown in FIG. 11C, the played motion is one that is used when the target object is shot from in front, as shown by G1 to G7 of FIG. 9. If a shot from the 2P player hits as shown in FIG. 11D, on the other hand, the played motion is one that is used when the target object is shot from the rear, as shown by I1 to I7 of FIG. 10.

In FIG. 8, motions are varied in accordance with the direction of the shot trajectory. However, in some circumstances it may be possible to specify the trajectory direction without having to determine the trajectory direction directly. In other words, the trajectory directions shown in FIGS. 11A to 11D can be determined by simply determining which player has fired a shot, even if the direction DS of the trajectory 72 of the shot is not determined directly.

This means that the processing load can be greatly reduced by identifying the player in order to vary the motion, instead of by identifying the trajectory direction in order to vary the motion.

In addition, the degree of variety of images can be further increased by combining the method of identifying the player for varying the motion with the method of identifying the trajectory direction for varying the motion. In other words, if the method of identifying the player for varying the motion is not used in the situation in FIGS. 11A and 11B, the same motion (the motion for when the target object is shot from in front) will be played, regardless if it was hit by a shot from the 1P player or by a shot from the 2P player. If the method of identifying the player for varying the motion is used instead, the motions can be made to be different, depending on whether a shot from the 1P player or a shot from the 2P player has hit the target object, making it possible to increase the degree of variety of the images that are provided.

In this embodiment, the motion can also be varied in accordance with the hit portion (or hit region, hit location) of the target object that has been hit.

In other words, if a shot hits the head (or hit portion) of the target object 50 as shown in FIG. 13A, the played motion is one that is used when the head has been shot. Similarly, if the torso is hit as shown in FIG. 13B, the played motion is one that is used when the torso has been shot. Furthermore, if the right leg is hit as shown in FIG. 13C, the played motion is one that is used when the right leg has been shot. This makes is possible to further increase the degree of variety and realism of images that are represented.

A third characteristic of this embodiment is described below. In this embodiment, an incoming-shot angle (or incident angle) between the direction of the trajectory of the shot that has hit the target object and the direction in which the target object is facing is first obtained. It is then determined which of a given plurality of angular ranges contains this incoming-shot angle. The motion of the target object is played on the basis of motion data that has been set for the angular range containing this incoming-shot angle.

Figure 14:
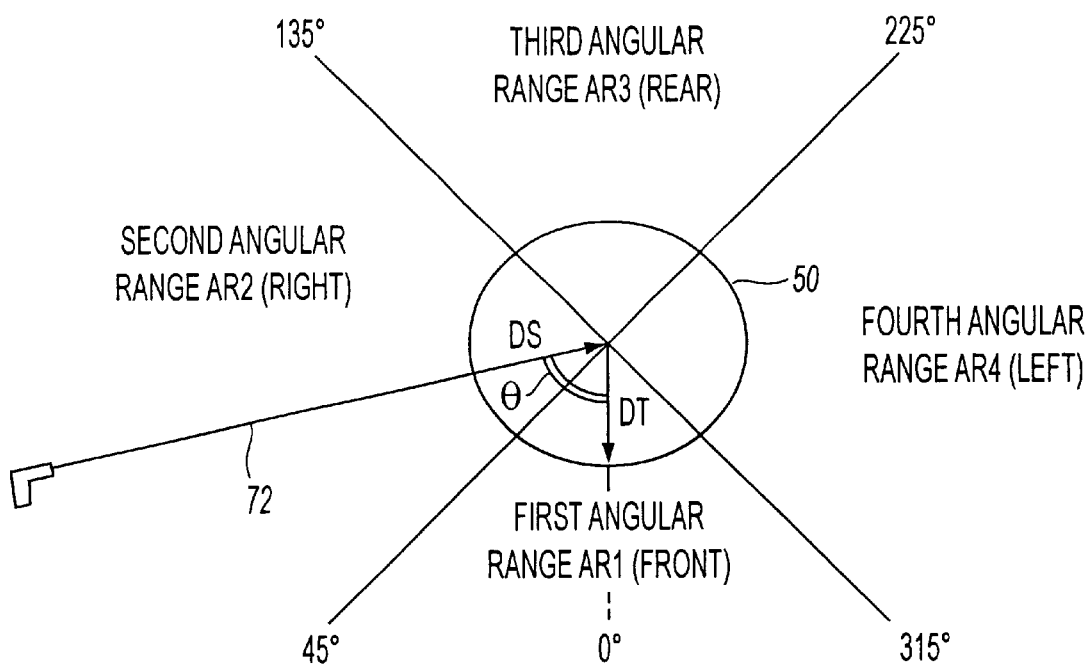
FIG. 14 is illustrative of a method of playing a motion on the basis of an angular range that contains the incoming-shot angle.

More specifically, a first angular range AR1 (315° to 45°), a second angular range AR2 (45° to 135°), a third angular range AR3 (135° to 225°), and a fourth angular range AR4 (225° to 315°) are provided as angular ranges, as shown in FIG. 14 by way of example. Motion data for when the target object is shot from in front (G1 to G7 of FIG. 9) is allocated to AR1, motion data for when the target object is shot from the right (J1 to J7 of FIG. 10) is allocated to AR2, motion data for when the target object is shot from the rear (I1 to I7 of FIG. 10) is allocated to AR3, and motion data for when the target object is shot from the left (H1 to H7 of FIG. 9) is allocated to AR4.

In FIG. 14, an incoming-shot angle θ, which is the angle between the direction DS of the trajectory 72 of the shot and the direction DT in which the target object 50 is facing, is within the second angular range AR2. Therefore, the played motion is one that is used when the target object is shot from the right (J1 to J7 of FIG. 10), which has been set to AR2.

Providing a plurality of angular ranges in this manner and playing the motion based on the motion data that has been set to the angular range that contains the incoming-shot angle makes it possible to reduce the quantity of motion data that needs to be provided. This makes it possible to reduce the storage capacity required for the motion data storage sections 120-1 and 120-2 of FIG. 3, thus enabling a reduction in the overall size of the hardware.

A fourth characteristic of this embodiment is that the orientation of a target object during motion play is corrected on the basis of the above described incoming-shot angle.

Figure 15A:
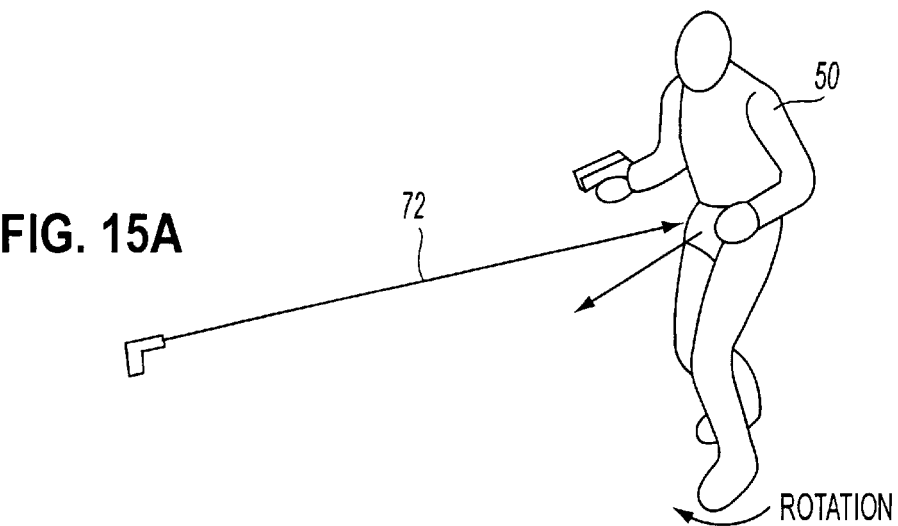
FIGS. 15A, 15B, and 15C are illustrative of a method of correcting the direction in which the target object is facing on the basis of incoming-shot angle.

If the trajectory 72 of a shot coming from in front of the target object 50 is slightly offset from the direction directly in front of the target object 50, as shown in FIG. 15A by way of example, the target object 50 is rotated slightly, then the motion indicating a shot from in front is played.

Figure 15B:
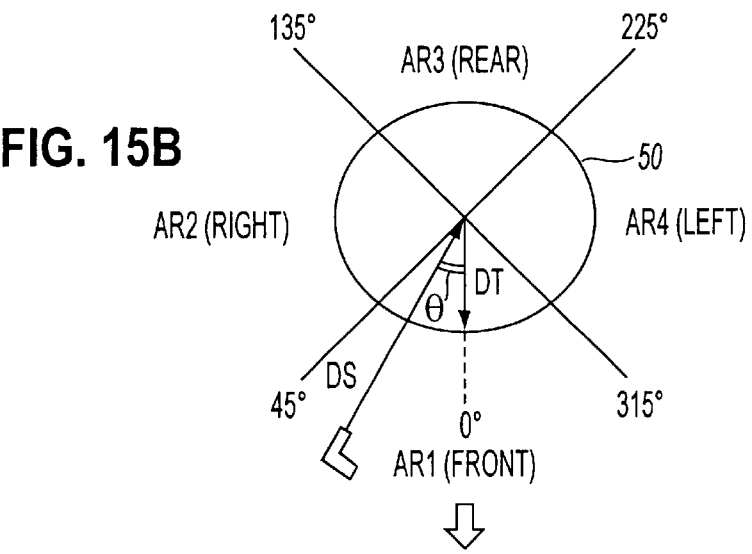
Figure 15C:
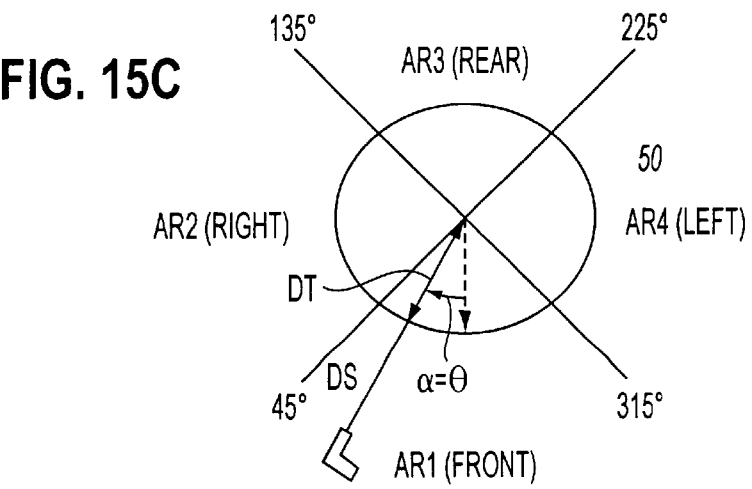

More specifically, if the incoming-shot angle θ is as shown in FIG. 15B, the direction DT in which the target object 50 is facing is rotated slightly clockwise through an angle α=θ, then the motion indicating a shot from in front is played.

Figure 16A:
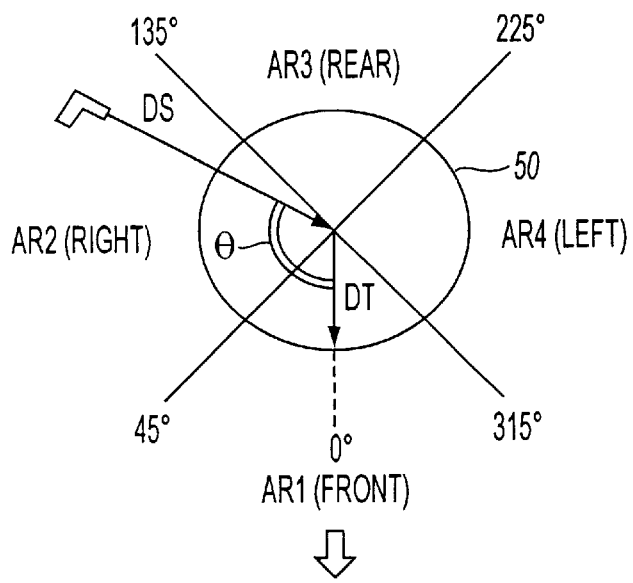
FIGS. 16A and 16B are further illustrative of a method of correcting the direction in which the target object is facing on the basis of incoming-shot angle.
Figure 16B:
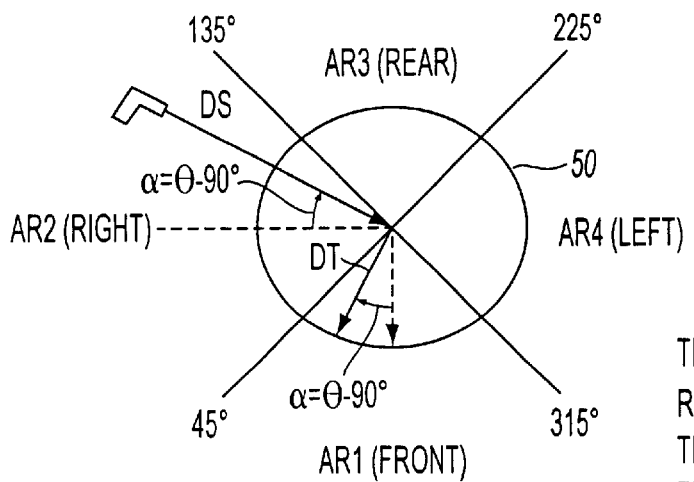

If the incoming-shot angle θ is as shown in FIG. 16A, the direction DT in which the target object 50 is facing is rotated clockwise through an angle α=(θ−90°), then the motion indicating a shot from the right is played.

In other words, the motion depicted by G1 to G7 of FIG. 9 indicates that the target object 50 has been shot from directly in front, so that the target object 50 falls straight backward after being hit. Therefore, if the incoming-shot angle θ is 30°, for example, and the motion data G1 to G7 of FIG. 9 that has been set for AR1 that contains θ=30° is played without any correction, there is a problem that the image will seem unnatural.

That is to say, since the target object 50 is hit by a shot with an incoming-shot angle θ of 30°, from the right front (at 30°), it ought to fall in a direction backwards but inclined towards the left (at 210°).

However, if the motion G1 to G7 of FIG. 9 is played without correction in such a case, the target object 50 will appear to fall directly backward (at 180°).

This embodiment of the invention plays the motion G1 to G7 of FIG. 9 after the target object 50 has been rotated clockwise through an angle of α=θ=30°. This makes it possible to increase the realism of the game image by making the target object 50 fall backwards towards the left, instead of directly backwards.

Note that this solves the problem by correcting the direction in which the target object 50 is facing on the basis of the incoming-shot angle, but this problem could also be solved by motion interpolation.

For example, if the trajectory of a shot is from the front left of the target object, the motion G1 to G7 and the motion H1 to H7 of FIG. 9 could be interpolated for each frame by using a given interpolation rate. This makes it possible to generate a motion to be used when the target object is shot from the front left, solving the above problem.

A fifth characteristic of this embodiment is described below. Images as seen from the first and second viewpoints within the object space are output to the first and second display screens 12-1 and 12-2 for the 1P and 2P players 20-1 and 20-2 of FIG. 2. The direction of trajectories of shots fired by the 1P and 2P players are specified on the basis of the first and second viewpoints and two-dimensional positions on the first and second display screens 12-1 and 12-2 that are indicated by the handgun-shaped controllers 22-1 and 22-2 of the 1P and 2P players. A hit check is performed and the motion of the target object is varied on the basis of thus specified trajectory direction.

Figure 17A:
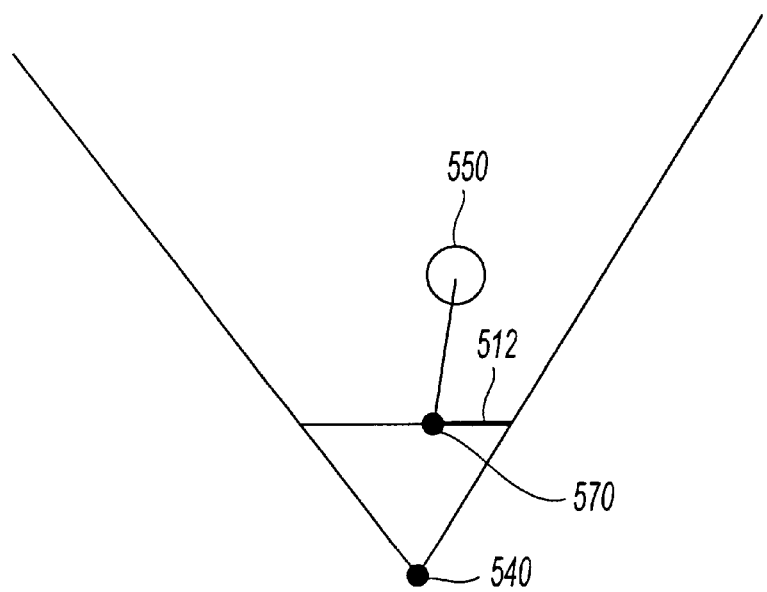
FIG. 17A is illustrative of a prior-art hit check method.

In other words, in a prior-art gun-wielding game such as that shown in FIG. 1B, a hit check is performed to determine whether or not a position 570 of a target object 550 (the projected position of the target object) on a display screen 512, as shown in FIG. 17A, matches the position indicated by the handgun-shaped controller (the position at which the handgun-shaped controller is pointing). In other words, the hit check is performed with absolutely no consideration paid to the trajectory of the shot. Since a viewpoint 540 of the first and second players 520-1 and 520-2 of FIG. 1B is the same, performing a hit check by this method does not cause a serious problem.

Figure 17B:
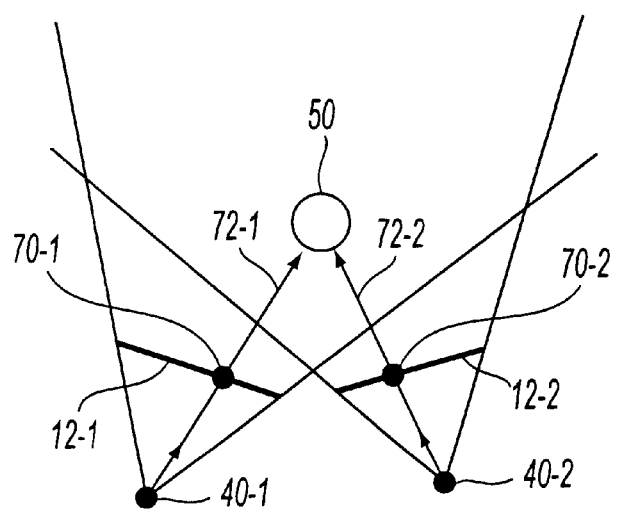
FIG. 17B is illustrative of the hit check method of this embodiment of the invention.

With this embodiment of the invention, the first and second viewpoints 40-1 and 40-2 of the 1P and 2P players are different, as shown in FIG. 17B. Therefore, a first trajectory 72-1 followed by a shot from the 1P player is aimed in a different direction from a second trajectory 72-2 followed by a shot from the 2P player.

In this case, if hit or miss were determined by the method shown in FIG. 17A, it would not be possible to determine the direction of a shot that has hit the target object. It is therefore not possible to implement a scenario in which the motion of the target object is varied with the trajectory direction.

With this embodiment, the directions of first and second trajectories 72-1 and 72-2 are specified by the first and second viewpoints 40-1 and 40-2 and two-dimensional positions 70-1 and 70-2 on the first and second display screens 12-1 and 12-2 that are indicated by the handgun-shaped controllers of the 1P and 2P players, as shown in FIG. 17B. A hit check between each shot and the target object 50 is then performed on the basis of thus specified trajectory directions, and the motion thereof is varied accordingly. This enables a dramatic increase in the realism of the game images.

Figure 18A:
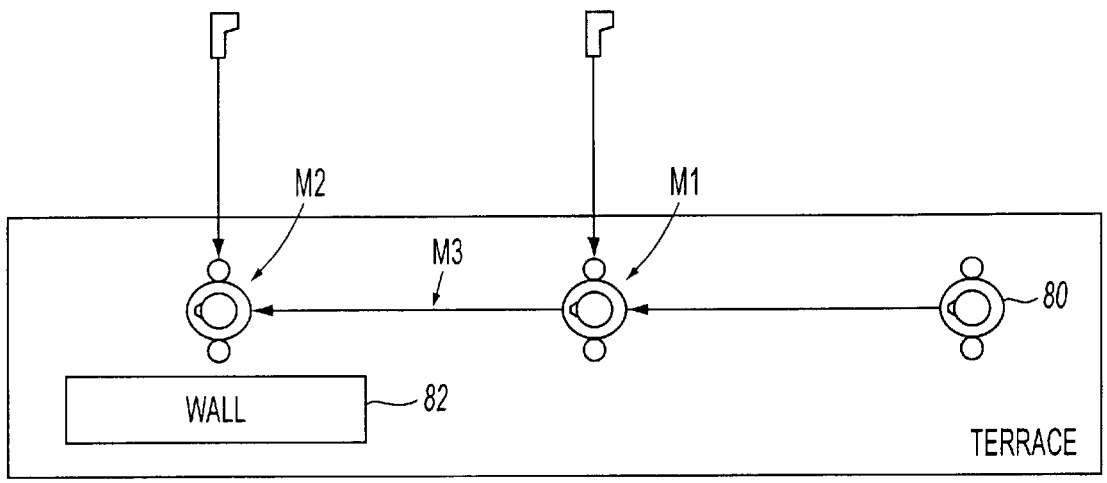
FIGS. 18A and 18B are illustrative of a method of varying the motion in accordance with whether or not a given condition has been met since the target object was generated.

A sixth characteristic of this embodiment is that the motion of the target object is varied in accordance with whether or not a given condition has been met since the target object was generated. For example, consider a case in which a target object 80 has appeared on the terrace, as shown in FIG. 18A. After this target object 80 has appeared, it moves (runs) as shown in FIG. 18A. If a shot from a player hits the target object 80 after it has moved to a position M1, the motion indicating a target object being shot from the right is played (such as a motion showing the target object falling from the terrace). On the other hand, if a shot from a player hits the target object 80 after it has moved to a position M2, play of the usual motion indicating a target object being shot from the right could result in an inconsistency in the generated game image. In other words, there is a wall 82 on the left side of the target object 80 when it is at the position M2, so that if the ordinary motion indicating a target object being shot from the right is played, an inconsistent image may be generated showing the target object 80 passing through the wall 82 to fall off the terrace.

In this embodiment of the invention, if the target object 80 is hit by a shot from the right before it has reached a position M3, for example, the ordinary motion indicating a target object being shot from the right is played. However, if the target object 80 is hit by a shot from the right after it has passed the position M3, the played motion is one that is prepared to indicate that the target object strikes the wall. This makes it possible to obtain a realistic image that is not inconsistent.

In this case, whether or not the target object 80 has passed the position M3 could be determined based on whether or not a given time has elapsed since the target object 80 was generated. Alternatively, the above determination could be based on whether or not a motion play has been repeated a given number of times. If, for example, it has been predetermined that the target object 80 will have reached the position M3 when a motion play has been repeated three times, the played motion could be changed to be the motion indicating that the target object strikes the wall after the motion play has been repeated three times.

Figure 18B:
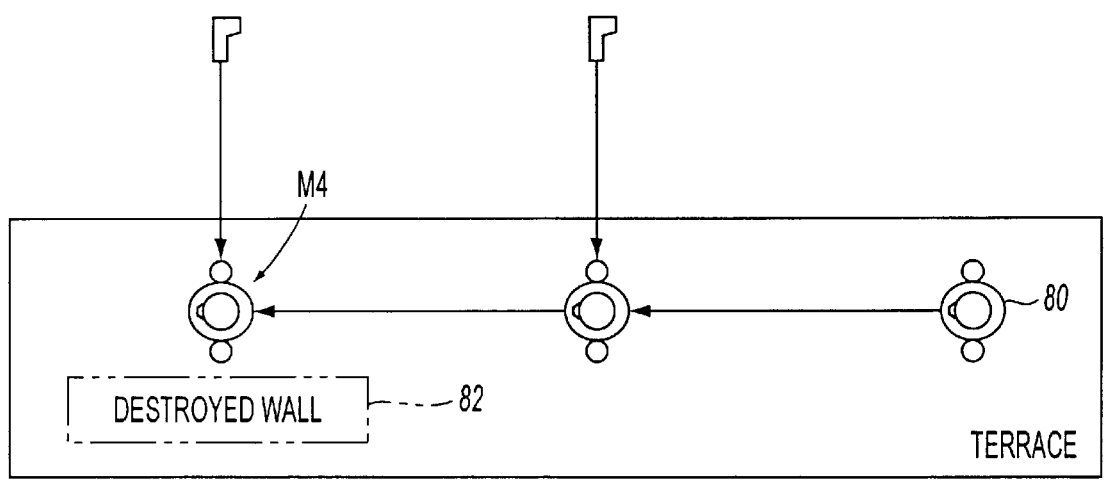

Note that the played motion could also be varied in accordance with whether or not an object relating to motion play of the target object has disappeared. For example, the wall 82 could have been destroyed by a player's shot or the like, by the time that the target object 80 has reached a position M4, as shown in FIG. 18B. If the motion indicating that the target object strikes the wall is played in such a case, as shown in FIG. 18A, the game image that is obtained would be inconsistent. Therefore, the system monitors a flag indicating whether the wall 82 is present in such a case, then plays the motion indicating that the target object strikes the wall if the wall 82 is present, or the ordinary motion indicating a target object being shot from the right if the wall 82 is not present.

Note that the given condition that varies the motion of the target object is not limited to that shown in FIGS. 18A and 18B, and various other conditions could be considered therefor.

A detailed example of the processing of this embodiment of the invention will now be described, with reference to the flowcharts of FIGS. 19 and 20.

Figure 19:
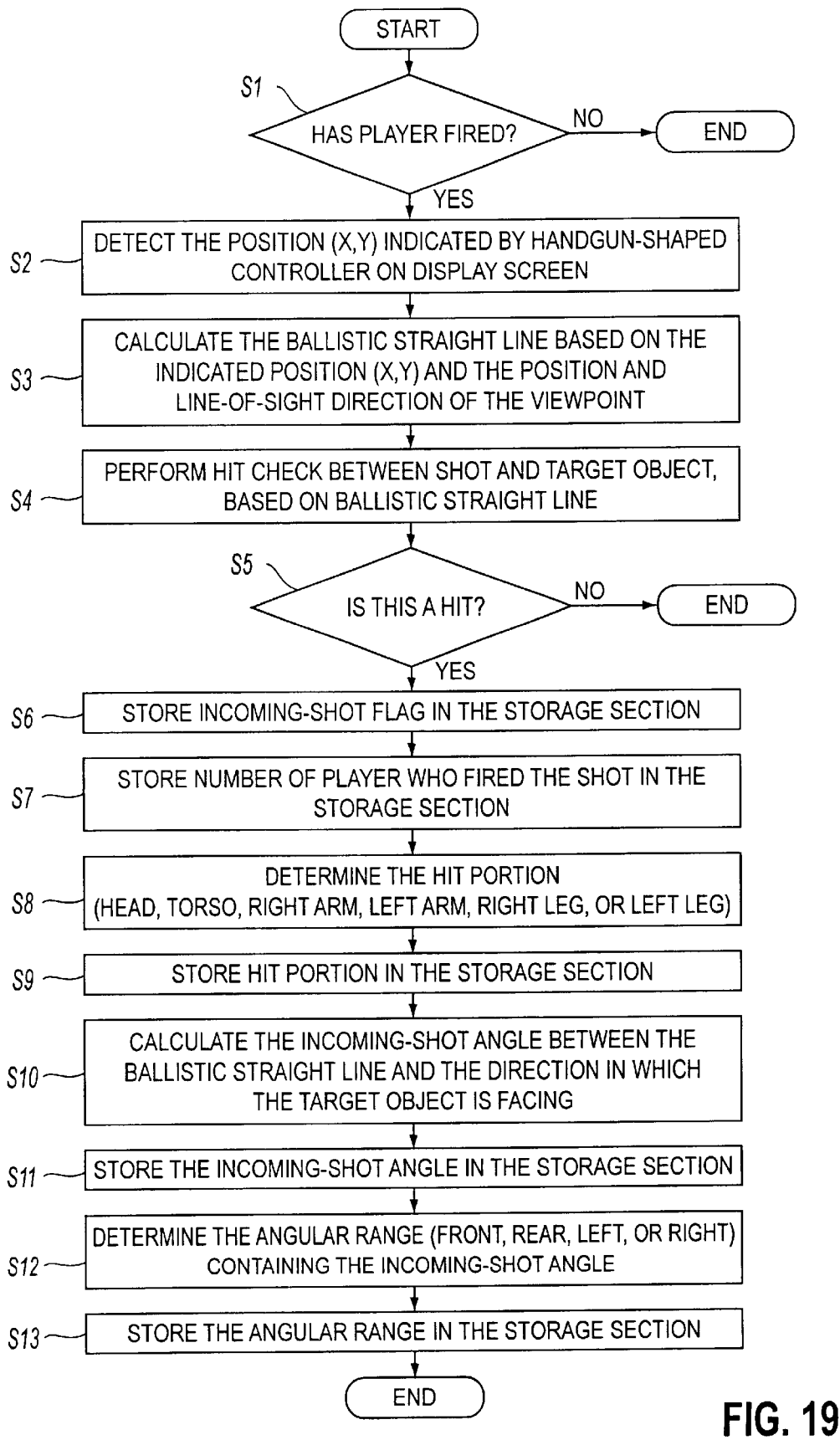
FIG. 19 is a flowchart illustrating a detailed processing example of this embodiment.

FIG. 19 is a flowchart of the processing performed by the hit check sections 114-1 and 114-2 of FIG. 3.

First of all, a check is made to determine whether or not a player has fired (step S1). If it has fired, the indicated (landing) position (X, Y coordinates) on the display screen is detected by the method described with reference to FIG. 3(step S2). The ballistic straight line (or trajectory direction) is calculated from the thus indicated position (X, Y) and the position and line-of-sight direction of the viewpoint (step S3).

A hit check between the shot from the player and the target object is then performed on the basis of thus calculated ballistic straight line (step S4). If it is determined that a hit has occurred, an incoming-shot flag is stored in a given storage section (memory or register) (steps S5 and S6). The number of the player that fired the shot is also stored in this storage section (step S7).

The hit portion of the target object that has been shot is then determined (step S8). This hit portion is stored in the storage section (step S9).

The incoming-shot angle, which is the angle between the ballistic straight line (or trajectory direction)obtained in step S3 and the direction in which the target object is facing, is then calculated (step S10). The thus calculated incoming-shot angle is also stored in the storage section (step S11).

The angular range containing the incoming-shot angle obtained in step S10 is then determined (step S12). This angular range is also stored in the storage section (step S13).

Figure 20:
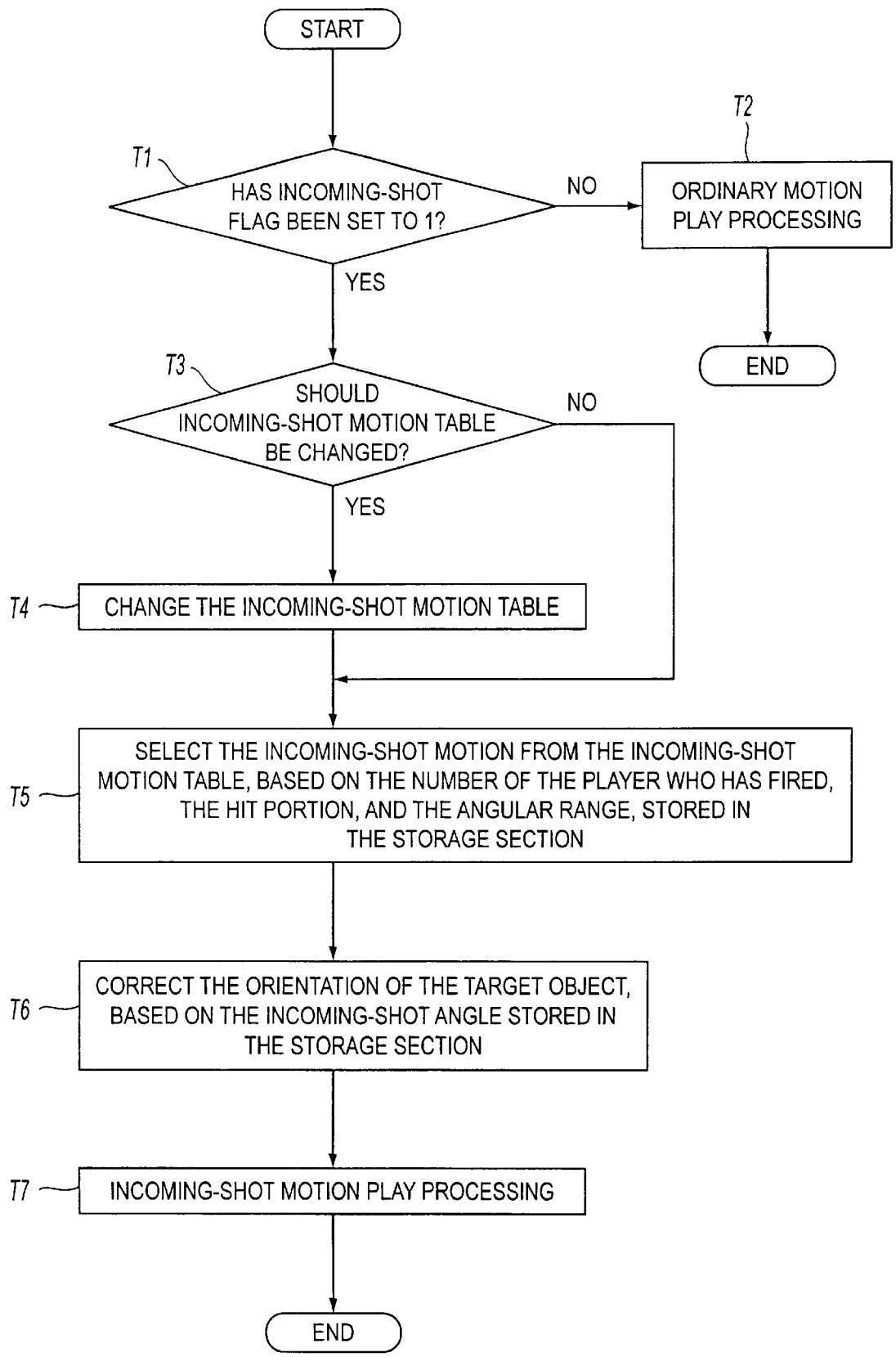
FIG. 20 is another flowchart illustrating a detailed processing example of this embodiment.

FIG. 20 is a flowchart of the processing performed by the motion play sections 118-1 and 118-2 of FIG. 3. The motion play sections 118-1 and 118-2 performs the processing that is described below on the basis of the various items of data stored in the above described storage section.

First of all, it is determined whether or not an incoming-shot flag (step S6 of FIG. 19) has been set to 1 (step T1). If an incoming-shot flag has been reset to 0, processing for the play of the ordinary motion is done (step T2).

Figure 21:
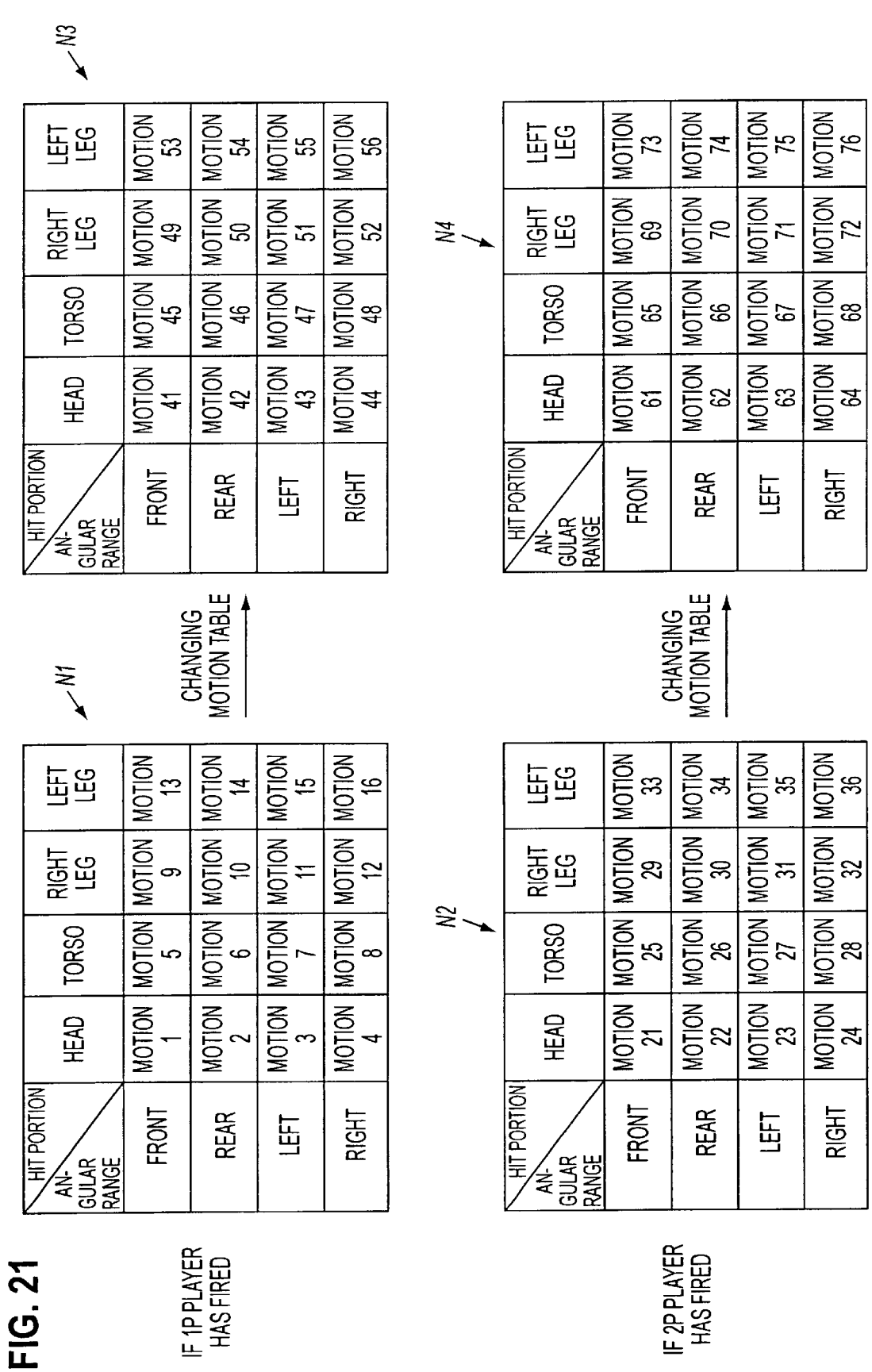
FIG. 21 shows examples of incoming-shot motion tables.

If an incoming-shot flag has been set to 1, it is determined whether or not an incoming-shot motion table should be changed (step T3). Examples of this incoming-shot motion table are shown in FIG. 21. Table N1 is the incoming-shot motion table used when the 1P player has fired and table N2 is the combining-shot motion table used when the 2P player has fired. If, for example, the 1P player has fired, the angular range containing the incoming-shot angle is "front," and the hit portion is "head," motion 1 is selected. Similarly, if the 2P player has fired, the angular range containing the incoming-shot angle is "left," and the hit portion is "torso," motion 27 is selected. Note that the incoming-shot motion table N1 and the incoming-shot motion table N2 could be set up to differ only in part, or they could be completely different.

If it is determined that the incoming-shot motion table should be changed, the incoming-shot motion table is then changed (step T4). If a given condition that changes the incoming-shot motion table has been met, as shown in FIGS. 18A and 18B by way of example, the incoming-shot motion table is changed, as shown in table N3 or N4 of FIG. 21. In this case, the incoming-shot motion table N1 and the incoming-shot motion table N3 could be set up to differ only in part, or they could be completely different. Similarly, the incoming-shot motion table N2 and the incoming-shot motion table N4 could be set up to differ only in part, or they could be completely different.

Next, the incoming-shot motion to be played is selected from the incoming-shot motion table of FIG. 21, based on the number of the player who has fired, the hit portion, and the angular range, which are stored in the above described storage section (step T5). By using the number of the player who has fired, it is possible to vary the incoming-shot motion in accordance with the player who has fired, as previously described with reference to FIGS. 11A to 11D by way of example. Similarly, the hit portion could be used to vary the incoming-shot motion in accordance with the hit portion, as previously described with reference to FIGS. 13A to 13C by way of example. Furthermore, the angular range could be used to vary incoming-shot motion in accordance with the ballistic straight line (or trajectory direction), as described with reference to FIG. 14 by way of example.

The orientation of the target object is then corrected on the basis of the incoming-shot angle stored in the storage section (step T6). The corrected incoming-shot motion is played (step T7). This makes it possible to obtain a more natural incoming-shot motion, as described with reference to FIG. 15A to FIG. 16B.

Figure 22:
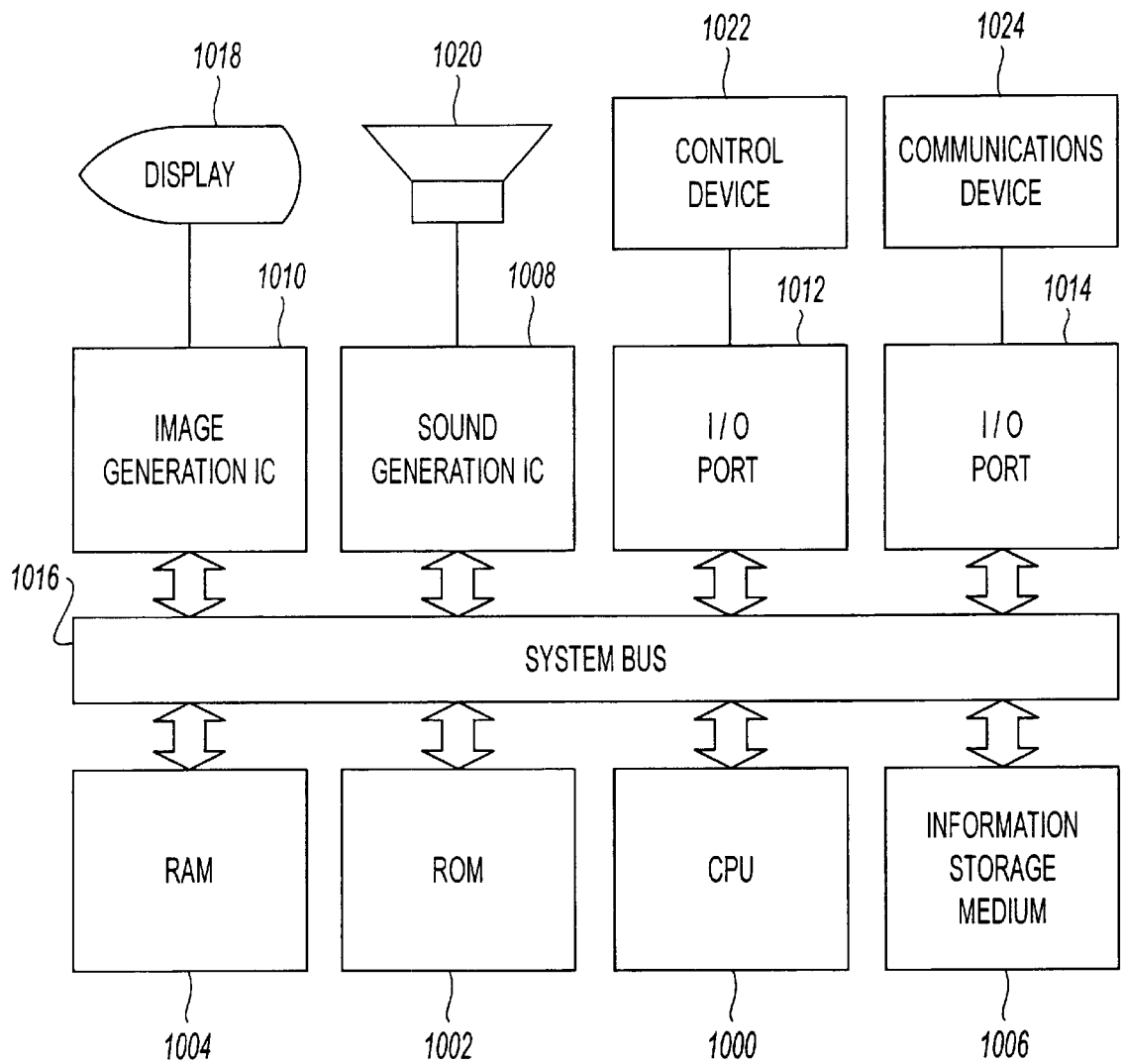
FIG. 22 shows an example of the configuration of hardware that can implement this embodiment.

The description now turns to an example of the configuration of hardware than can implement this embodiment of the invention, with reference to FIG. 22. In the apparatus shown in this figure, a CPU 1000, ROM 1002, RAM 1004, an information storage medium 1006, a sound generation IC 1008, an image generation IC 1010, and I/O ports 1012 and 1014 are connected together by a system bus 1016 so that data can be mutually transferred therebetween. A display 1018 is connected to the image generation IC 1010, a speaker 1020 is connected to the sound generation IC 1008, a control device 1022 is connected to the I/O port 1012, and a communications device 1024 is connected to the I/O port 1014.

A program and image data, sound data, or the like for representing display objects is mainly stored in the information storage medium 1006. Means such as a CD-ROM, game cassette, or DVD could be used as an information storage medium for storing a game program for a domestic game machine. Alternatively, memory such as ROM could be used for an arcade game machine, in which case the information storage medium 1006 is the ROM 1002.

The control device 1022 is equivalent to a game controller or operating panel and it is used as a device for inputting into the main unit of the device the results of decisions made by the player as the game progresses.

The CPU 1000 controls the entire device and processes data in accordance with a game program stored in the information storage medium 1006, a system program stored in the ROM 1002 (including initialization information for the main unit), and signals input through the control device 1022. The RAM 1004 is a storage means that is used as a work space for the CPU 1000, and specific details from the information storage medium 1006 or the ROM 1002, or the results of calculations by the CPU 1000, are stored therein. A data configuration having a logical structure suitable for implementing this embodiment of the invention (for example, the structure of object data and motion data) is constructed within this RAM or information storage medium.

The provision of the sound generation IC 1008 and the image generation IC 1010 in this type of device makes is possible to output game sounds and game images as required. The sound generation IC 1008 is an integrated circuit device that generates game sounds such as sound effects and background music, based on information stored in the information storage medium 1006 or the ROM 1002, and the thus generated game sounds are output by the speaker 1020. The image generation IC 1010 is an integrated circuit device that generates pixel information for output to the display 1018, based on image information that is sent from components such as the RAM 1004, the ROM 1002, and the information storage medium 1006. Note that a device called a head-mounted display (HMD) could also be used as the display 1018.

The communications device 1024 transfers various types of information used within the game machine to and from external devices, and it is used to send or receive given information in accordance with a game program when connected to another game machine, or to send or receive information such as a game program through a communications line.

The processing described with reference to FIGS. 2 to 18B and FIG. 21 is implemented by components such as the information storage medium 1006 that contains a game program for performing processing such as that shown in the flowcharts of FIGS. 19 and 20, the CPU 1000 that operates in accordance with that program, and the image generation IC 1010 and sound generation IC 1008. Note that the processing performed by the image generation IC 1010 and the sound generation IC 1008 could be performed in a software manner by means such as the CPU 1000 or a general-purpose DSP.

An example of this embodiment applied to an arcade game machine is shown in the previously described FIG. 2. In this case, components such as a CPU, an image generation IC, and a sound generation IC are mounted on a system board 1106 built into the device. Information is stored in a memory 1108, which is the information storage medium on the system board 1106. This information storage medium comprises various types of information such as information for performing processing for setting a plurality of objects, including a target object, within the object space; information for performing a hit check between a shot from a player and the target object; information for storing motion data for a target object; information for playing the motion of a target object on the basis of the motion data when a shot has hit the target object, and also varying the motion of the target object in accordance with the direction of the trajectory of the shot that has hit the target object; information for generating an image as seen from a given viewpoint within the object space; and information for varying the motion of a target object in accordance with which player's shot has hit the target object, when a plurality of players are playing a game. This information is hereinafter called stored information. This stored information comprises at least one type of information, such as program coding for performing the above described processing, image information, sound information, shape information for display objects, table data, list data, or player information.

Figure 23A:
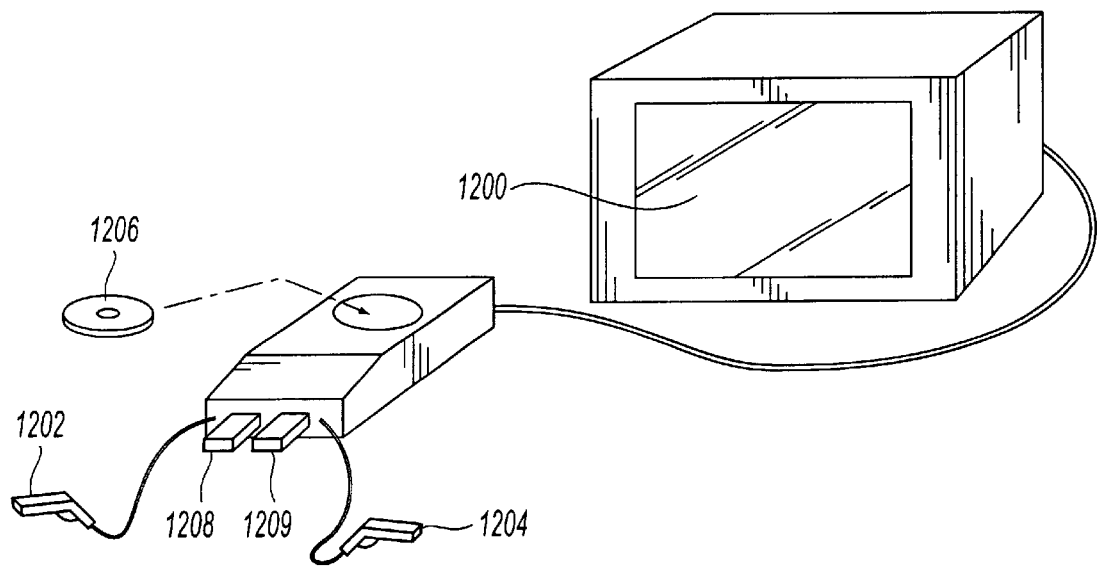
FIGS 23A and 23B show examples of various devices to which this embodiment is applied.

An example of this embodiment applied to a domestic game machine is shown in FIG. 23A. Players enjoy the game by manipulating game controllers 1202 and 1204 while viewing a game image shown on a display 1200. In this case, the above described stored information is stored in a CD-ROM 1206 or IC cards 1208 and 1209, which are information storage media that can be freely inserted into and removed from the main unit.

Figure 23B:
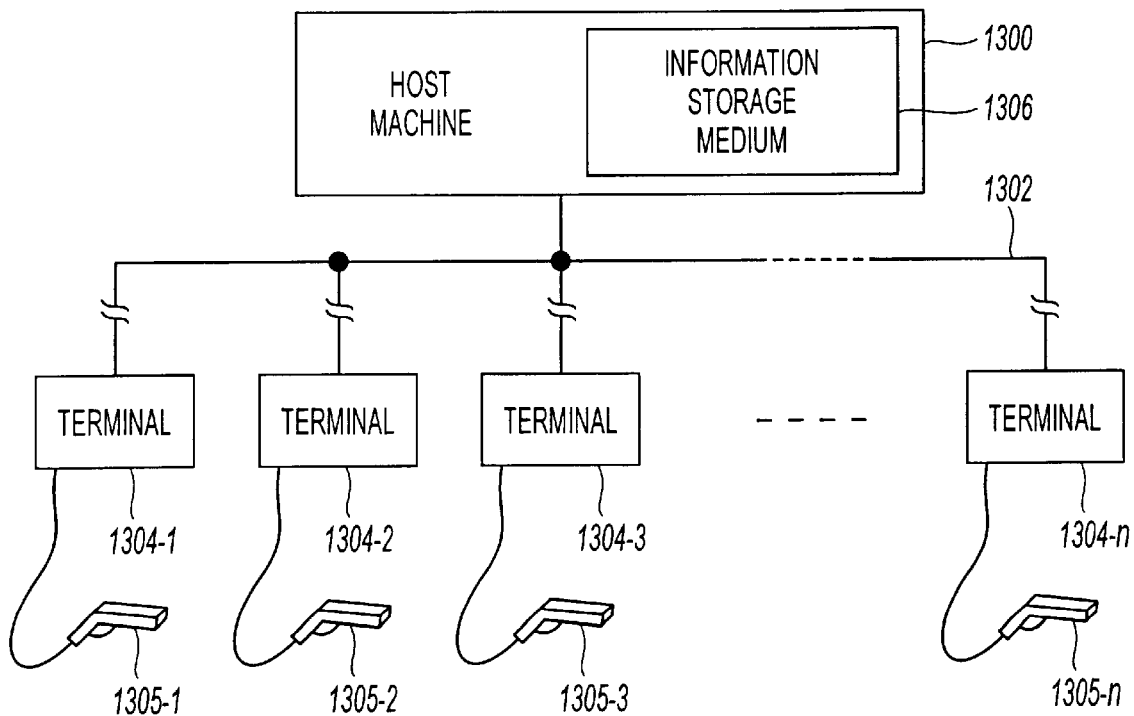

An example of this embodiment applied to a game machine is shown in FIG. 23B, where the game machine comprises a host machine 1300 and terminals 1304-1 to 1304-n connected to the host machine 1300 by communication lines 1302. In this case, controllers 1305-1 to 1305-n are connected to each of the terminals 1304-1 to 1304-n, by way of example. The above described stored information is stored in an information storage medium 1306 such as a magnetic disk device, magnetic tape device, or memory that can be controlled by the host machine 1300. Each of the terminals 1304-1 to 1304-n has a CPU, an image generation IC, and a sound generation IC. In addition, if game images and sounds can be generated thereby in a stand-alone manner, means such as a game program for generating game images and sounds is transferred to the terminals 1304-1 to 1304-n from the host machine 1300. On the other hand, if they cannot be generated in a stand-alone manner, the host machine 1300 generates the game images and sound then transfers them to the terminals 1304-1 to 1304-n for output by those terminals.

Note that this invention is not limited to the above described embodiments and it can be implemented in various other ways.

Figure 24:
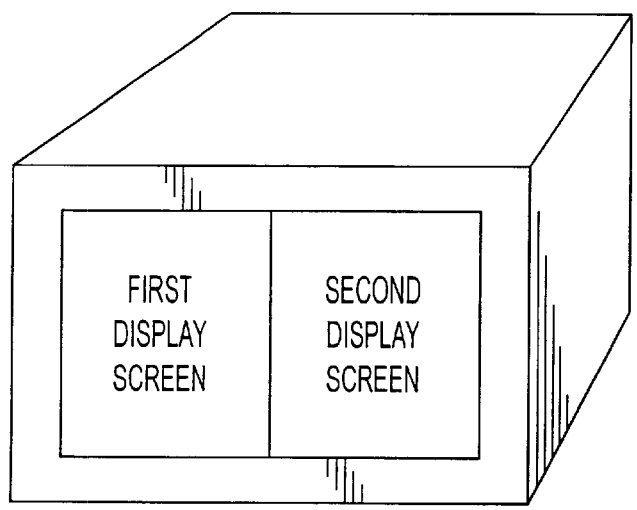
FIG. 24 illustrates an example of a method of displaying first and second display screens on a single screen.

For example, this invention is particularly effective for a configuration in which images from different viewpoints are output to two or more display screens, as shown in FIG. 2, but it is not limited to such a configuration. Note that if the configuration is such that images from different viewpoints are output to two or more display screens, they could be displayed on a single display device, as shown in FIG. 24, instead of first and second display devices. Such a method is particularly useful when this invention is applied to a domestic game machine, such as that shown in FIG. 23A.

Similarly, the hit check method described with reference to FIG. 17B is particularly preferable, but the invention is not limited thereto.

Figure 25:
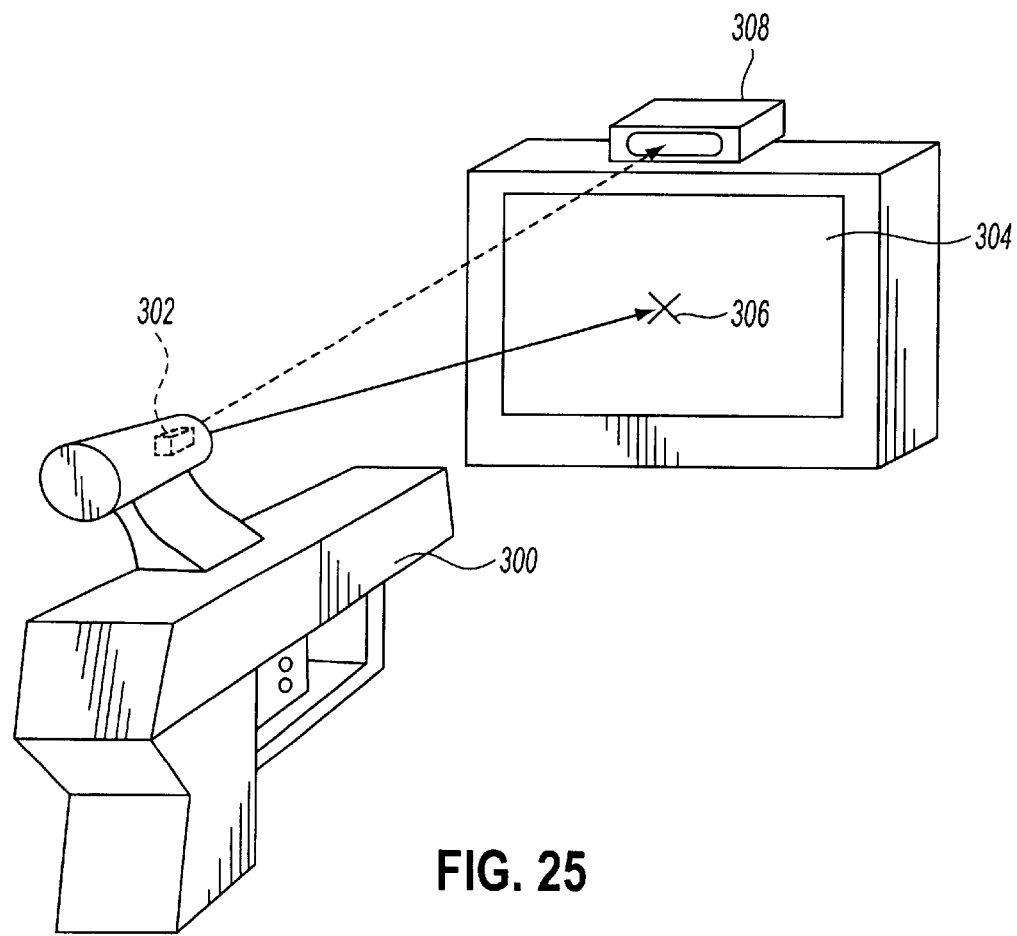
FIG. 25 illustrates another example of a method of detecting the coordinates of a position indicated by a shooting device.

Furthermore, the method of detecting the coordinates of the two-dimensional position indicated by a shooting device is not limited to that described with reference to FIG. 3. For example, a light-emitting device 302 that emits a beam of light such as an infrared beam could be provided at a shooting device 300, as shown in FIG. 25. The light from this light-emitting device 302 is received by a light-receiving device 308 provided on a display screen 304 side. This detects the coordinates of a two-dimensional position 306 indicated by the shooting device 300.

With this implementation of the present invention, the coordinates of the indicated position could be detected by the transfer of light generated from the display screen side, or the coordinates of the indicated position could equally well be detected by the transfer of light generated from the shooting device side. Alternatively, the coordinates of the indicated position could be detected by both light generated from the display screen side and light generated from the shooting device side.

When light from the display screen side is used, the detection of the coordinates of the indicated position could be based, not on the scan beam from the indicated position, but on light detected form a light-emitting device that has been placed on the display screen side.

This invention is also not limited to gun-wielding games using handgun-shaped controllers; it can be applied to shooting games using shooting devices that are modeled on firearms such as rifles, laser-guns, or cannons, or to shooting games of the type in which shooting devices are fixed to a casing.

This invention is also not limited to domestic and arcade game machines; it can be applied to various other image generation devices such as simulators, large-scale attractions in which many players can participate, personal computers, multimedia terminals, and system boards that generate game images.

What is claim is:

1. An image generation device for generating an image that enables at least one player to use a shooting device to shoot at least one target object within an object space, said image generation device comprising:

means for processing for setting a plurality of objects, including a target object, within said object space;

means for performing a hit check between a shot from said player and a target object;

means for storing motion data for a target object;

means for playing the motion of a target object on the basis of said motion data when a shot has hit said target object, and also varying the motion of said target object in accordance with the direction of the trajectory of said shot that has hit said target object and the hit portion of said target object that has been hit by the shot; and means for generating an image as seen from a given viewpoint within said object space.

2. The image generation device as defined in claim 1, wherein an angular range that contains said angle is determined from a given plurality of angular ranges; and wherein the motion of said target object is played on the basis of motion data that has been set to said angular range that contains said angle.

3. The image generation device as defined in claim 1, wherein the orientation of a target object during motion play is corrected on the basis of said angle.

4. An image generation device for generating an image that enables at least one player to use a shooting device to shoot at least one target object within an object space, said image generation device comprising:

means for processing for setting a plurality of objects, including a target object, within said object space;

means for performing a hit check between a shot from said player and a target object means for storing motion data for a target object;

means for playing the motion of a target object on the basis of said motion data when a shot has hit said target object, and also varying the motion of said target object in accordance with the direction of the trajectory of said shot that has hit said target object; and means for generating an image as seen from a given viewpoint within said object space;

wherein an image as seen from a first viewpoint in said object space is generated and said generated image is output to a first display screen for a first player;

wherein an image as seen from a second viewpoint in said object space is generated and said generated image is output to a second display screen for a second player;

wherein the direction of the trajectory of a shot from said first player is specified on the basis of said first viewpoint and a two-dimensional position on said first display screen indicated by a shooting device of said first player, and a hit check is performed and the motion of said target object is varied on the basis of the thus specified trajectory direction; and wherein the direction of the trajectory of a shot from said second player is specified on the basis of said second viewpoint and a two-dimensional position on said second display screen indicated by a shooting device of said second player, and a hit check is performed and the motion of said target object is varied on the basis of the thus specified trajectory direction.

5. An information storage medium used in an image generation device for generating an image that enables at least one player to use a shooting device to shoot at at least one target object within an object space, said information storage medium comprising:

information for processing for setting a plurality of objects, including a target object, within said object space;

information for performing a hit check between a shot from said player and a target object;

information for storing motion data for a target object;

information for playing the motion of a target object, on the basis of said motion data, when a shot has hit said target object, and also varying the motion of said target object in accordance with the direction of the trajectory of said shot that has hit said target object; and information for generating an image as seen from a given viewpoint within said object space;

wherein the motion of a target object is varied on the basis of an angle between the direction of the trajectory of a shot that has hit said target object and the direction in which said target object is facing.

6. The information storage medium as defined in claim 5, wherein an angular range that contains said angle is determined from a given plurality of angular ranges; and wherein the motion of said target object is played on the basis of motion data that has been set to said angular range that contains said angle.

7. The information storage medium as defined in claim 5, wherein the orientation of a target object during motion play is corrected on the basis of said angle.

8. An information storage medium used in an image generation device for generating an image that enables at least one player to use a shooting device to shoot at at least one target object within an object space, said information storage medium comprising:

information for processing for setting a plurality of objects, including a target object, within said object space;

information for performing a hit check between a shot from said player and a target object;

information for storing motion data for a target object;

information for playing the motion of a target object on the basis of said motion data, when a shot has hit said target object, and also varying the motion of said target object in accordance with the direction of the trajectory of said shot that has hit said target object; and information for generating an image as seen from a given viewpoint within said object space;

wherein an image as seen from a first viewpoint in said object space is generated and said generated image is output to a first display screen for a first player;

wherein an image as seen from a second viewpoint in said object space is generated and said generated image is output to a second display screen for a second player;

wherein the direction of the trajectory of a shot from said first player is specified on the basis of said first viewpoint and a two-dimensional position on said first display screen indicated by a shooting device of said first player, and a hit check is performed and the motion of said target object is varied on the basis of the thus specified trajectory direction; and wherein the direction of the trajectory of a shot from said second player is specified on the basis of said second viewpoint and a two-dimensional position on said second display screen indicated by a shooting device of said second player, and a hit check is performed and the motion of said target object is varied on the basis of the specified trajectory direction.

9. An image generating method for generating an image that enables at least one player to use a shooting device to shoot at least one target object within an object space, comprising:

setting a plurality of objects, including a target object, within said object space;

performing a hit check between a shot from said player and a target object;

storing motion data for a target object;

playing the motion of a target object on the basis of said motion data when a shot has hit said target object, and also varying the motion of said target object in accordance with the direction of the trajectory of said shot that has hit said target object; and generating an image as seen from a given viewpoint within said object space;

wherein the motion of a target object is varied on the basis of an angle between the direction of the trajectory of a shot that has hit said target object and the direction in which said target object is facing.

10. An image generation method for generating an image that enables at least one player to use a shooting device to shoot at least one target object within an object space, comprising:

setting a plurality of objects, including a target object, within said object space;

performing a hi check between a shot from said player and a target object;

storing motion data for a target object;

playing the motion of a target object on the basis of said motion data when a shot has hit said target object, and also varying the motion of said target object in accordance with the motion of said target object in accordance with the direction of the trajectory of said shot that has hit said target object; and generating an image as seen from a given viewpoint within said object space;

wherein an image as seen from a first viewpoint in said object space is generated and said generated image is output to a first display screen for a first player;

wherein an image as seen from a second viewpoint in said object space is generated and said generated image is output to a second display screen for a second player;

wherein the direction of the trajectory of a shot from said first player is specified on the basis of said first viewpoint and a two-dimensional position on said first display screen indicated by a shooting device of said first player, and a hit check is performed and the motion of said target object is varied on the basis of the thus specified trajectory direction; and wherein the direction of the trajectory of a shot from said second player is specified on the basis of said second viewpoint and a two-dimensional position on said second display screen indicated by a shooting device of said second player, and a hit check is performed and the motion of said target object is varied on the basis of the thus specified trajectory direction.

* * * * *